(12) United States Patent
To et al.

(10) Patent No.: US 8,780,825 B2
(45) Date of Patent: Jul. 15, 2014

(54) COMMUNICATION SYSTEM, COMMUNICATION DEVICE AND COMMUNICATION METHOD THAT CAN IMPROVE FREQUENCY USE EFFICIENCY

(75) Inventors: Shimpei To, Osaka (JP); Minoru Kubota, Osaka (JP); Yasuhiro Hamaguchi, Osaka (JP); Hideo Namba, Osaka (JP); Kazunari Yokomakura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 400 days.

(21) Appl. No.: 12/921,082

(22) PCT Filed: Mar. 5, 2009

(86) PCT No.: PCT/JP2009/054166
§ 371 (c)(1),
(2), (4) Date: Sep. 3, 2010

(87) PCT Pub. No.: WO2009/110547
PCT Pub. Date: Sep. 11, 2009

(65) Prior Publication Data
US 2011/0007701 A1 Jan. 13, 2011

(30) Foreign Application Priority Data
Mar. 5, 2008 (JP) ............................... P2008-055133

(51) Int. Cl.
*H04W 4/00* (2009.01)
(52) U.S. Cl.
USPC ...................................................... 370/329
(58) Field of Classification Search
CPC ..... H04W 84/18; H04W 84/12; H04W 88/08; H04W 8/26; H04I 2012/5608; H04B 7/2045; H04B 7/208; H04B 72/0446

USPC ......... 370/329, 331, 328, 319, 431, 310, 312, 370/313
See application file for complete search history.

(56) References Cited

U.S. PATENT DOCUMENTS 5,828,660 A * 10/1998 Baum et al. .................. 370/330
2005/0265222 A1 * 12/2005 Gerlach ........................ 370/208
(Continued)

FOREIGN PATENT DOCUMENTS

| CN | 1189939 A | 8/1998 |
| JP | 7-115681 A | 5/1995 |

(Continued)

OTHER PUBLICATIONS

3GPP TSG RAN WG1 #42 on LTE, "DFT-Spread OFDM with Pulse Shaping Filter in Frequency Domain in Evolved UTRA Uplink", NTT DoCoMo, NEC, Sharp, Aug. 29-Sep. 2, 2005, R1-050702, pp. 1-8.

(Continued)

*Primary Examiner* — Anh Ngoc Nguyen
(74) *Attorney, Agent, or Firm* — Birch, Stewart, Kolasch & Birch, LLP

(57) ABSTRACT

A communication system that transmits a signal from a first communication device to a second communication device using a plurality of frequency channels, wherein at least one of the plurality of frequency channels uses part of subcarriers in an overlapping manner with one or more adjacent frequency channels, the first communication device includes a transmission unit which transmits a signal to the second communication device using one or more of the plurality of frequency channels, and the second communication device includes a reception unit which receives the signal transmitted by the transmission unit.

7 Claims, 21 Drawing Sheets

(56) References Cited

U.S. PATENT DOCUMENTS

| | | | |
|---|---|---|---|
| 2006/0245390 A1* | 11/2006 | Omoto et al. | 370/328 |
| 2007/0082619 A1* | 4/2007 | Zhang et al. | 455/69 |
| 2007/0082692 A1* | 4/2007 | Tirkkonen et al. | 455/522 |
| 2008/0025422 A1* | 1/2008 | Bitran et al. | 375/260 |
| 2008/0304584 A1 | 12/2008 | Nishio et al. | |

FOREIGN PATENT DOCUMENTS

| JP | 10-294680 A | 11/1998 |
|---|---|---|
| JP | 2002-319917 A | 10/2002 |
| JP | 2005-286508 A | 10/2005 |
| JP | 2006-287895 A | 10/2006 |
| WO | 2007/146685 A1 | 12/2007 |

OTHER PUBLICATIONS

3GPP TSG RAN WG1 #48, "Interference between Data and RACH in EUTRA", Texas Instruments, R1-070716, Feb. 12-16, 2007, pp. 1-7.

3GPP TSG RAN WG1 #50bis, "Interference between Sounding Reference Signal and Random Access Preamble", Texas Instruments, R1-074133, Oct. 8-12, 2007, pp. 1-6.

M. Tuchler et al., "Linear time and frequency domain Turbo equalization", Vehicular Technology Conference, 2001. VTC 2001 Fall, IEEE VTS 54th, 2001, pp. 2773-2777.

* cited by examiner

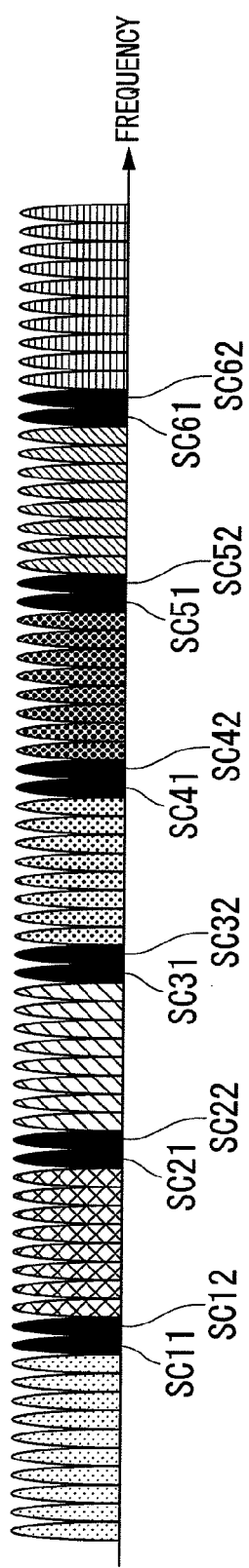

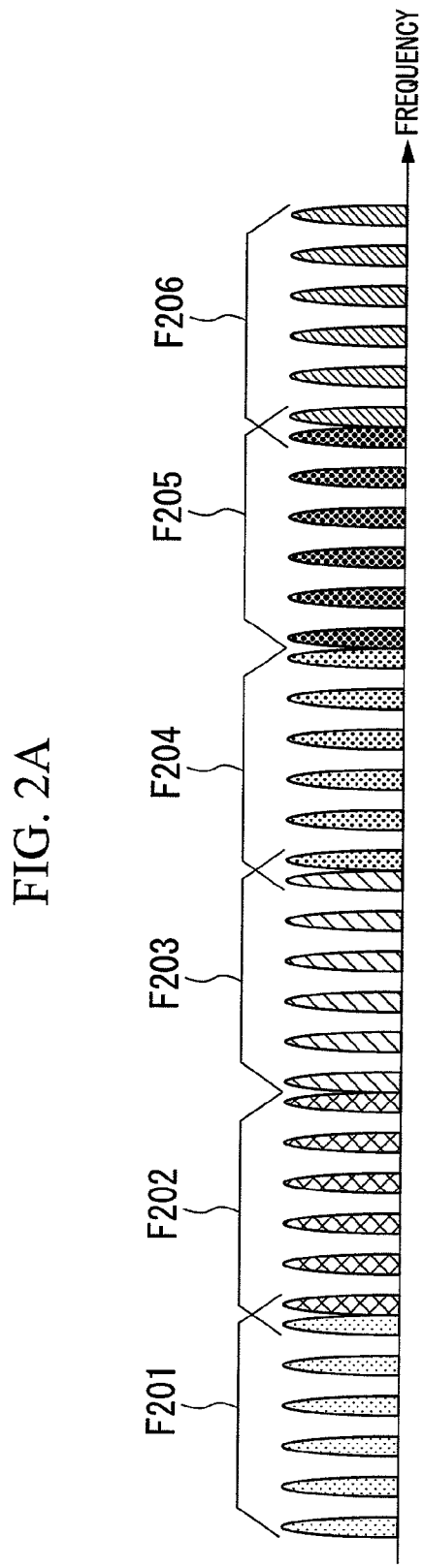

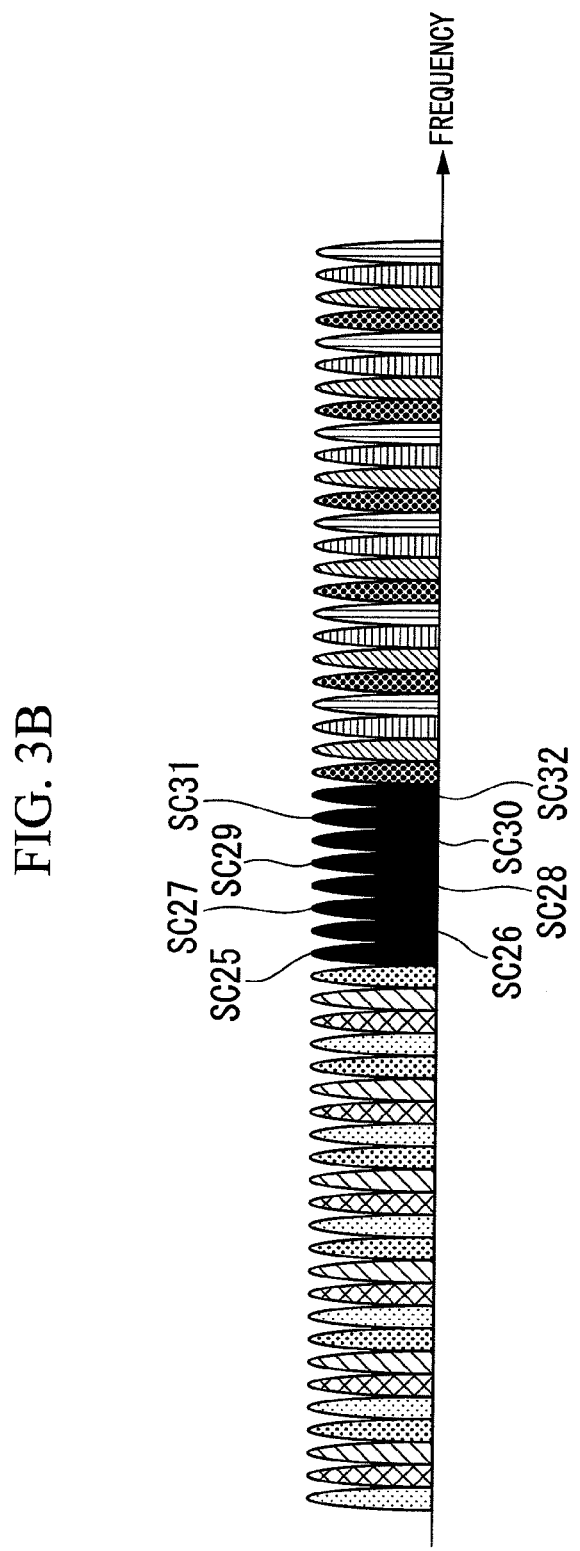

COMMUNICATION SYSTEM, COMMUNICATION DEVICE AND COMMUNICATION METHOD THAT CAN IMPROVE FREQUENCY USE EFFICIENCY

TECHNICAL FIELD

The present invention relates to a communication system, a communication device and a communication method.

This application claims priority to and the benefits of Japanese Patent Application No. 2008-055133 filed on Mar. 5, 2008, the contents of which are incorporated herein by reference.

BACKGROUND ART

With the recent increase in the amount of data communication, there is a growing need for mobile communication systems having higher frequency use efficiency. Thus, one-cell reuse cellular systems using the same frequency band in all cells are being studied.

An evolved universal terrestrial radio access (E-UTRA) system is one of the one-cell reuse cellular systems, and is being standardized mainly in 3rd Generation Partnership Project (3GPP). In the E-UTRA system, the use of an orthogonal frequency division multiple access (OFDMA) scheme is being studied as a downlink transmission scheme. Also, in the E-UTRA system, the use of a single carrier-frequency division multiple access (SC-FDMA) scheme as an uplink transmission scheme is being studied.

The OFDMA scheme is a scheme by which a user has access in resource block units divided by time and frequency by using an orthogonal frequency division multiple (OFDM) signal having excellent tolerance against multi-path fading. The OFDMA scheme is not suitable as a transmission scheme in which a transmission power limit is strict, since the OFDMA scheme has a high peak-to-average power ratio (PAPR) characteristic.

On the other hand, an SC-FDMA scheme is able to suppress the PAPR characteristic to be low in comparison with a multicarrier scheme such as OFDM and realize a wide coverage. Thus, the SC-FDMA scheme is suitable for uplink transmission (Non-Patent Document 1).

FIG. 14 is a schematic block diagram showing the configuration of a terminal device 100z when the SC-FDMA scheme is used for uplink transmission. As shown in FIG. 14, in the terminal device 100z using the SC-FDMA scheme, an encoding unit 1000 performs error correction coding on transmission data and a modulation unit 1001 performs modulation.

Next, a transmission signal modulated by the modulation unit 1001 is serial/parallel (S/P) converted in an S/P conversion unit 1002. Thereafter, a DFT (discrete Fourier transform) unit 1003 performs conversion from a time domain signal into a frequency domain signal.

The transmission signal converted into the frequency domain signal is mapped to subcarriers used for transmission by a subcarrier mapping unit 1004. At this time, the mapping is performed based on mapping information transmitted from a base station device. The mapping information is obtained as it is transmitted from the base station device to the terminal device 100z, received by a reception antenna 1011, converted from an analog signal into a digital signal by a radio unit 1012 and an A/D (analog/digital) conversion unit 1013, and demodulated by a reception unit 1014. In a mapping process, zero is inserted into subcarriers not used for transmission.

In the E-UTRA system, the use of "localized" mapping using continuous subcarriers is being studied. "Distributed" mapping using subcarriers separated by a uniform interval is also being studied in the E-UTRA system.

FIG. 15A is a diagram showing an example of localized mapping. FIG. 15B is a diagram showing an example of distributed mapping. In FIGS. 15A and 15B, the horizontal axis is the frequency. FIG. 15A shows the case where 72 subcarriers are arranged in the frequency direction. In FIG. 15A, the subcarriers are allocated to 6 users $U_A$, $U_B$, $U_C$, $U_D$, $U_E$ and $U_F$ (not shown). (In this and other figures, subcarrier allocations are represented by different shading, where each shading represents a different user. Subcarriers allocated to the same user have the same shading.)

FIG. 15A shows a localized arrangement in which the number of subcarriers constituting one subchannel is 12. Here, the 6 users (the users $U_A$ to $U_F$) are frequency division multiplexed and are arranged in respective subcarriers. Specifically, the user $U_A$ is allocated to the $1^{st}$ to $12^{th}$ subcarriers in a frequency domain F901. The user $U_B$ is allocated to the $13^{th}$ to $24^{th}$ subcarriers in a frequency domain F902.

The user $U_C$ is allocated to the $25^{th}$ to $36^{th}$ subcarriers in a frequency domain F903. The user $U_D$ is allocated to the $37^{th}$ to $48^{th}$ subcarriers in a frequency domain F904. The user $U_E$ is allocated to the $49^{th}$ to $60^{th}$ subcarriers in a frequency domain F905. The user $U_F$ is allocated to $61^{st}$ to $72^{nd}$ subcarriers in a frequency domain F906.

FIG. 15B shows a distributed arrangement when the number of subcarriers constituting one subchannel is 8. FIG. 15B shows the case where 64 subcarriers are arranged in the frequency direction. Here, 8 users are frequency division multiplexed. FIG. 15B shows the case where the 64 subcarriers are arranged in the frequency direction. In FIG. 15B, the subcarriers are allocated to 8 users $U_A$, $U_B$, $U_C$, $U_D$, $U_E$, $U_F$, $U_G$ and $U_H$.

Specifically, the $1^{st}$ user is allocated to the $1^{st}$, $5^{th}$, $9^{th}$, $13^{th}$, $17^{th}$, $21^{st}$, $25^{th}$ and $29^{th}$ subcarriers. The $2^{nd}$ user is allocated to the $2^{nd}$, $6^{th}$, $10^{th}$, $14^{th}$, $18^{th}$, $22^{nd}$, $26^{th}$ and $30^{th}$ subcarriers. The $3^{rd}$ user is allocated to the $3^{rd}$, $7^{th}$, $11^{th}$, $19^{th}$, $23^{rd}$, $27^{th}$ and $31^{st}$ subcarriers. The $4^{th}$ user is allocated to the $4^{th}$, $8^{th}$, $12^{th}$, $16^{th}$, $20^{th}$, $24^{th}$, $28^{th}$ and $32^{nd}$ subcarriers.

The $5^{th}$ user is allocated to the $33^{rd}$, $37^{th}$, $41^{st}$, $45^{th}$, $49^{th}$, $53^{rd}$, $57^{th}$ and $61^{st}$ subcarriers. The $6^{th}$ user is allocated to the $34^{th}$, $38^{th}$, $42^{nd}$, $46^{th}$, $50^{th}$, $54^{th}$, $58^{th}$ and $62^{nd}$ subcarriers. The $7^{th}$ user is allocated to the $35^{th}$, $39^{th}$, $43^{rd}$, $47^{th}$, $51^{th}$, $55^{th}$, $59^{th}$ and $63^{rd}$ subcarriers. The $8^{th}$ user is allocated to the $36^{th}$, $40^{th}$, $44^{th}$, $48^{th}$, $52^{nd}$, $56^{th}$, $60^{th}$ and $64^{th}$ subcarriers.

In the above-described mapping, the localized arrangement is suitable for obtaining a multiuser diversity gain, and the distributed arrangement is suitable for obtaining a frequency diversity gain.

Referring back to FIG. 14, a transmission signal is mapped onto subcarriers used for transmission by the subcarrier mapping unit 1004 of the terminal device 100z. The mapped transmission signal is input into an IFFT (inverse fast Fourier transform) unit 1005 and converted from a frequency domain signal into a time domain signal.

A P/S (parallel/serial) conversion unit 1006 converts the signal from a parallel signal to a serial signal.

A CP (cyclic prefix) insertion unit 1007 inserts a cyclic prefix. The cyclic prefix is a signal obtained by copying a rear portion of a symbol after IFFT.

Thereafter, a D/A (digital/analog) conversion unit 1008 performs conversion from a digital signal into an analog signal. A radio unit 1009 performs up-conversion into a radio frequency band signal, which is then transmitted from a transmission antenna 1010.

The transmitted signal generated as described above has the characteristic of a lower PAPR than a multicarrier signal.

FIG. 16 is a schematic block diagram showing the configuration of a conventional base station device 200z. The base station device 200z receives a signal transmitted from the terminal device 100z (FIG. 14).

The base station device 200z receives a signal of an SC-FDMA scheme. In the base station device 200z, a signal received by an antenna 2000 is converted into a frequency for A/D conversion by a radio unit 2001. Thereafter, an A/D conversion unit 2002 performs conversion from an analog signal into a digital signal.

Next, a synchronization unit 2003 establishes symbol synchronization. A cyclic prefix removal unit 2004 removes a cyclic prefix from every symbol. Thereafter, an S/P conversion unit 2005 performs conversion from a serial signal into a parallel signal. An FFT unit 2006 performs conversion from a time domain signal into a frequency domain signal.

A pilot signal for propagation channel estimation converted into the frequency domain signal is output to a propagation channel estimation unit 2007, and subjected to the propagation channel estimation. The pilot signal is a known signal transmitted with a data signal from the terminal device 100z.

As shown in FIGS. 15A and 15B, in a signal received by the base station device 200z, signals transmitted from a plurality of terminal devices are frequency division multiplexed. In the signal received by the base station device 200z, subcarriers used for each terminal device are assembled by a subcarrier demapping unit 2008 based on mapping information determined in advance by a scheduling unit 2012. The mapping information is information indicating which terminal device uses which subcarrier.

Thereafter, an equalization unit 2009 performs an equalization process on received subcarriers assembled for each terminal device using a propagation channel estimation value. An IDFT (inverse discrete Fourier transformation) unit 2010 performs conversion from a frequency domain signal into a time domain signal. Thereafter, a demodulation and error correction decoding unit 2011 reproduces the transmission data from each terminal device and outputs the resultant data as reception data.

A pilot signal for reception level measurement is output from the FFT unit 2006 to the scheduling unit 2012. Based on the result of the reception level measurement using the pilot signal, the scheduling unit 2012 performs scheduling according to the propagation situation of each terminal device.

The mapping information determined in the scheduling unit 2012 is, for example, modulated in a transmission unit 2013. A D/A unit 2014 performs conversion from a digital signal into an analog signal. A radio unit 2015 performs up-conversion into a radio frequency, which is then transmitted from an antenna 2016 to each terminal device. The mapping information is used when a signal is transmitted in the next and subsequent frames at the transmitter.

As the uplink transmission scheme of the E-UTRA system, the above-described SC-FDMA scheme is most prominent. Like the OFDMA scheme, the SC-FDMA scheme is also a scheme by which a user has access in resource block units completely divided by time and frequency. By using the SC-FDMA scheme, it is possible to implement a one-cell reuse system which suppresses the PAPR characteristic to be low and realize a wide coverage.

However, in the current environment in which the shortage of frequency resources is accelerated with an increase of the number of users, it is necessary to increase the number of users capable of being accommodated and to further effectively use a frequency.

Non-Patent Document 1: 3GPP, TSG RAN WG1 on LTE, R1-050702, "DFT-spread OFDM with Pulse Shaping Filter in Frequency Domain in Evolved UTRA Uplink"

DISCLOSURE OF INVENTION

Problem to be Solved by the Invention

The present invention has been made in view of the above-described circumstances, and an object of the invention is to provide a communication system, a communication device and a communication method that can increase the number of users capable of being accommodated and that can effectively use a frequency.

Means for Solving the Problem (1) The present invention has been made to solve the above-described problems. According to an aspect of the present invention, there is provided a communication system that transmits a signal from a first communication device to a second communication device using a plurality of frequency channels, wherein at least one of the plurality of frequency channels uses part of subcarriers in an overlapping manner with one or more adjacent frequency channels, the first communication device includes a transmission unit which transmits a signal to the second communication device using one or more of the plurality of frequency channels, and the second communication device includes a reception unit which receives the signal transmitted by the transmission unit.

(2) In the communication system according to the aspect of the present invention, the first communication device may generate a frequency spread signal by frequency spreading a signal, and allocate the frequency spread signal to a frequency channel of the signal transmitted by the transmission unit.

(3) In the communication system according to the aspect of the present invention, the first communication device may switch single carrier transmission and multicarrier transmission, and use a frequency channel other than the frequency channel using the subcarriers in an overlapping manner with the one or more adjacent frequency channels when the multicarrier transmission is performed.

(4) In the communication system according to the aspect of the present invention, the first communication device may use frequency channels which do not overlap with each other when a plurality of frequency channels are simultaneously used.

(5) According to another aspect of the present invention, there is provided a first communication device which transmits a signal to a second communication device using one or more of a plurality of frequency channels, the first communication device including: a subcarrier mapping unit which allocates a transmission signal to a frequency channel having part of subcarriers overlapping with one or more adjacent frequency channels; and a transmission unit which transmits a signal to the second communication device using the frequency channel to which the transmission signal is allocated.

(6) According to further another aspect of the present invention, there is provided a second communication device which receives signals transmitted from a plurality of first communication devices using a plurality of frequency channels, the second communication device including: a reception unit which separates and receiving signals transmitted from the plurality of first communication devices that use part of subcarriers in an overlapping manner when a signal transmitted from the first communication device uses the part of subcarriers in an overlapping manner with a signal transmitted from another first communication device that uses one or more adjacent frequency channels.

(7) According to further another aspect of the present invention, there is provided a communication method of transmitting a signal from a first communication device to a second communication device using a plurality of frequency channels, wherein the first communication device includes: a subcarrier mapping process of allocating a transmission signal to a frequency channel that uses part of subcarriers in an overlapping manner with one or more adjacent frequency channels; and a transmitting process of transmitting a signal to the second communication device using the frequency channel allocated in the subcarrier mapping process, and the second communication device includes a receiving process of receiving the signal transmitted by the first communication device in the transmitting process.

Effect of the Invention

A communication system, a communication device and a communication method of the present invention can increase the number of users (the number of subcarriers) capable of being accommodated while maintaining the transmission rate per user (subchannel), and can effectively use a frequency.

BRIEF DESCRIPTION OF THE DRAWINGS

FIG. 1B is a diagram showing an example of an arrangement of data signals according to the first embodiment of the present invention.

FIG. 2A is a diagram showing another example of an arrangement of pilot signals according to the first embodiment of the present invention.

FIG. 3B is a diagram showing a further another example of an arrangement of data signals according to the first embodiment of the present invention.

Figure 1A:
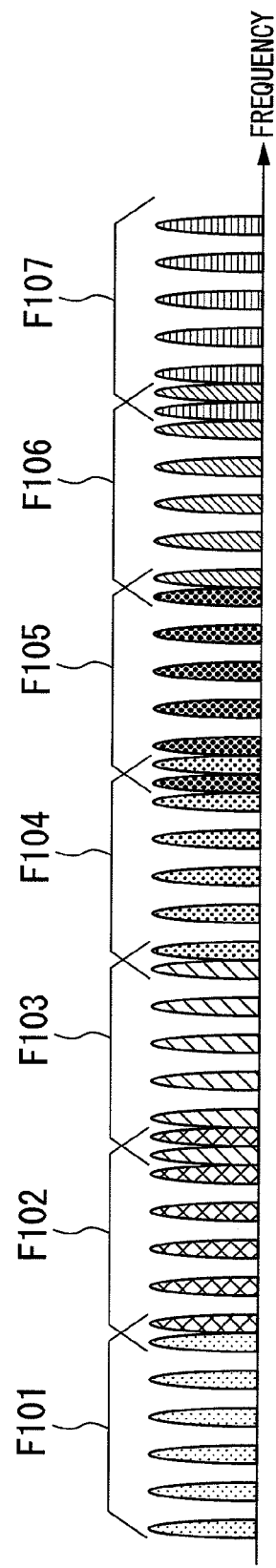
FIG. 1A is a diagram showing an example of an arrangement of pilot signals according to a first embodiment of the present invention.

REFERENCE SYMBOLS 100, 100-$a$, 100-$b$: Reception antenna
101, 101-$a$, 101-$b$: Radio unit
102, 102-$a$, 102-$b$: A/D conversion unit
103, 103-$a$, 103-$b$: Synchronization unit
104, 104-$a$, 104-$b$: CP removal unit
105, 105-$a$, 105-$b$: S/P conversion unit
106, 106-$a$, 106-$b$: FFT unit
107-$a$, 107-$b$: Propagation channel estimation unit
108-$a$, 108-$b$: Subcarrier separation unit
109-$a$, 109-$b$: Non-overlapping subcarrier equalization unit
110: Overlapping subcarrier equalization unit
111: Synthesis unit
112: Subcarrier demapping unit
113: IDFT unit
114: Demodulation and error correction decoding unit
115: Scheduling unit
116: Transmission unit
117: D/A unit
118: Radio unit
119: Transmission antenna
200: Subcarrier demapping unit
201-$a$, 201-$b$: Cancellation unit
202-$a$, 202-$b$: Equalization unit
203-$a$, 203-$b$: Demodulation and error correction decoding unit
204-$a$, 204-$b$: Iteration control unit
205-$a$, 205-$b$: Determination unit
206-$a$, 206-$b$: Replica generation unit
207-$a$, 207-$b$: DFT unit
208-$a$, 208-$b$: Interference spectrum selection unit
209: User switching unit

BEST MODE FOR CARRYING OUT THE INVENTION (First Embodiment)

According to a first embodiment of the present invention, a communication system includes a terminal device (also referred to as a first communication device) and a base station device (also referred to as a second communication device). In this embodiment, some subcarriers of a subchannel used by the terminal device are also used in another terminal device. The terminal device transmits data using subchannels notified from the base station device. Thus, the terminal device of this embodiment may have the same configuration as a terminal device (FIG. 14) of the related art. The configuration of the base station device will be described later in second and third embodiments. In the present embodiment, a subchannel arrangement in a system in which some subcarriers within a subchannel are used in an overlapping manner with a user allocated to another subchannel will be described.

FIG. 1A shows an example of an arrangement of pilot signals according to the first embodiment of the present invention. FIG. 1B shows an example of an arrangement of data signals according to the first embodiment of the present invention. In FIGS. 1A and 1B, the horizontal axis is the frequency. In FIG. 1B, 72 subcarriers are arranged in the frequency direction. In the description of FIGS. 1A and 1B, the case of allocating the subcarriers to 7 users $U_A$, $U_B$, $U_C$, $U_D$, $U_E$, $U_F$ and $U_G$ will be described.

As shown in FIGS. 1A and 1B, some subcarriers are used in an overlapping manner with another subchannel in a localized arrangement of the present embodiment. That is, in the localized arrangement of the present embodiment, several subcarriers at an end of a subchannel are used in an overlapping manner with an adjacent subchannel.

Specifically, as shown in FIG. 1A, a pilot signal of the user $U_A$ is allocated to the $1^{st}$, $3^{rd}$, $5^{th}$, $7^{th}$, $9^{th}$ and $11^{th}$ subcarriers in a frequency domain F101. A pilot signal of the user $U_B$ is allocated to the $12^{th}$, $14^{th}$, $16^{th}$, $18^{th}$, $20^{th}$ and $22^{nd}$ subcarriers in a frequency domain F102.

A pilot signal of the user $U_E$ is allocated to the $21^{st}$, $23^{rd}$, $25^{th}$, $27^{th}$, $29^{th}$ and $31^{st}$ subcarriers in a frequency domain F103. A pilot signal of the user $U_D$ is allocated to the $32^{nd}$, $34^{th}$, $36^{th}$, $38^{th}$, $40^{th}$ and $42^{nd}$ subcarriers in a frequency domain F104.

A pilot signal of the user $U_E$ is allocated to the $41^{st}$, $43^{rd}$, $45^{th}$, $47^{th}$, $49^{th}$ and $51^{st}$ subcarriers in a frequency domain F105. A pilot signal of the user $U_F$ is allocated to the $52^{nd}$, $54^{th}$, $56^{th}$, $58^{th}$, $60^{th}$ and $62^{nd}$ subcarriers in a frequency domain F106.

A pilot signal of the user $U_G$ is allocated to the $61^{st}$, $63^{rd}$, $65^{th}$, $67^{th}$, $69^{th}$ and $71^{st}$ subcarriers in a frequency domain F107.

As shown in FIG. 1B, a data signal of the user $U_A$ is allocated to the $1^{st}$ to $12^{th}$ subcarriers. A data signal of the user $U_B$ is allocated to the $11^{th}$ to $22^{nd}$ subcarriers.

A data signal of the user $U_C$ is allocated to the $21^{st}$ to $32^{nd}$ subcarriers. A data signal of the user $U_D$ is allocated to the $31^{st}$ to $42^{nd}$ subcarriers.

A data signal of the user $U_E$ is allocated to the $41^{st}$ to $52^{nd}$ subcarriers. A data signal of the user $U_F$ is allocated to the $51^{st}$ to $62^{nd}$ subcarriers.

A data signal of the user $U_G$ is allocated to the $61^{st}$ to $72^{nd}$ subcarriers.

That is, the $11^{th}$ and $12^{th}$ subcarriers SC11 and SC12 are allocated to the user $U_A$ and the user $U_B$ in an overlapping manner. (In FIG. 1B and other figures, subcarriers allocated in an overlapping manner are represented by full black shading.) The $21^{st}$ and $22^{nd}$ subcarriers SC21 and SC22 are allocated to the user $U_B$ and the user $U_C$ in an overlapping manner. The $31^{st}$ and $32^{nd}$ subcarriers SC31 and SC32 are allocated to the user $U_C$ and the user $U_D$ in an overlapping manner.

The $41^{st}$ and $42^{nd}$ subcarriers SC41 and SC42 are allocated to the user $U_D$ and the user $U_E$ in an overlapping manner. The $51^{st}$ and $52^{nd}$ subcarriers SC51 and SC52 are allocated to the user $U_E$ and the user $U_F$ in an overlapping manner. The $61^{st}$ and $62^{nd}$ subcarriers SC61 and SC62 are allocated to the user $U_F$ and the user $U_G$ in an overlapping manner.

In this embodiment, when a data signal is transmitted, two subcarriers at an end of a subchannel are used in an overlapping manner with a user allocated to an adjacent subchannel. The number of overlapping subcarriers is different among subchannels (subchannels of the frequency domains F101 and F107) at both ends of a band and the other subchannels (subchannels of the frequency domains F102, F103, F104, F105 and F106).

To perform highly accurate propagation channel estimation, a pilot signal for propagation channel estimation is arranged not to overlap with another subchannel (user). It is possible to maintain a low PAPR characteristic by using the pilot signals of the distributed arrangement as shown in FIG. 1A.

In this regard, a propagation channel of a subcarrier position where a pilot signal is not transmitted is estimated by interpolating or extrapolating the propagation channel of a subcarrier position where a pilot signal is transmitted. Through such a subchannel arrangement, the following effects are obtained under the condition that the total number of subcarriers and the number of subcarriers constituting one subchannel are identical. That is, only 6 subchannels (which accommodate only 6 users) are provided in FIG. 15A, while 7 subchannels (which accommodate 7 users) are provided in FIG. 1A. Thus, it is possible to increase the number of users capable of being accommodated.

In the subchannel arrangements shown in FIGS. 1A and 1B, the number of overlapping subcarriers is different among subchannels (subchannels of the frequency domains F101 and F107) at both ends of a band and the other subchannels (subchannels of the frequency domains F102, F103, F104, F105 and F106). Thus, the reception quality (interference amount) is different between the subchannels.

Figure 2B:
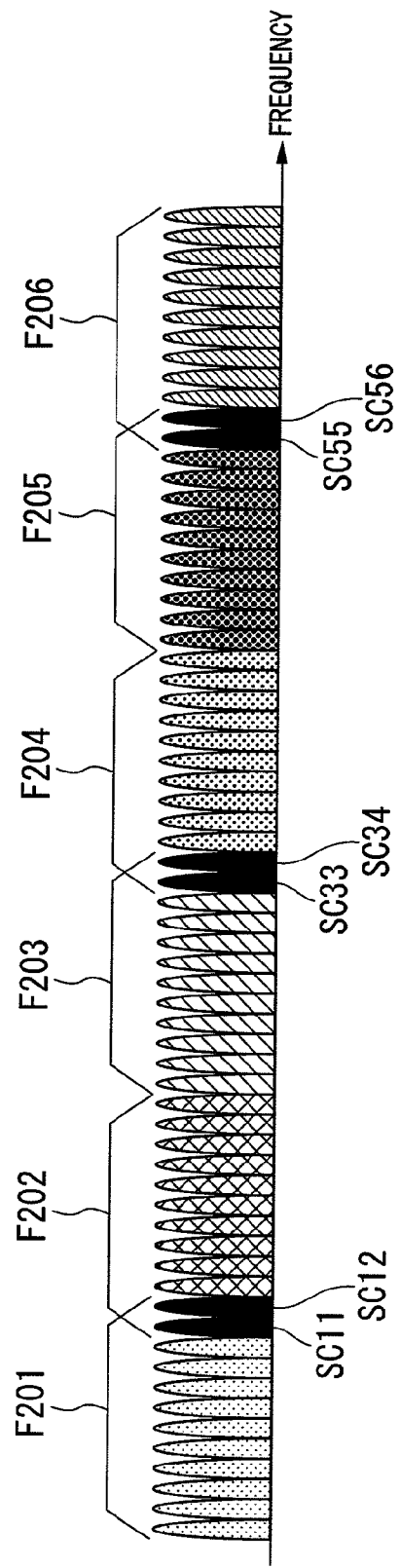
FIG. 2B is a diagram showing another example of an arrangement of data signals according to the first embodiment of the present invention.

FIG. 2A is a diagram showing another example of an arrangement of pilot signals according to a first embodiment of the present invention. FIG. 2B is a diagram showing another example of an arrangement of data signals according to the first embodiment of the present invention. In FIGS. 2A and 2B, the horizontal axis is the frequency. In FIG. 2B, 66 subcarriers are arranged in the frequency direction. In the description of FIGS. 2A and 2B, the case of allocating the 66 subcarriers to 6 users $U_A$, $U_B$, $U_C$, $U_D$, $U_E$ and $U_F$ will be described.

In FIGS. 2A and 2B, the subchannel arrangement in which the number of subcarriers overlapping with other subchannels is identical in all subchannels is used. In FIG. 2A, pilot signals having the distributed arrangement capable of maintaining a low PAPR characteristic are shown.

As shown in FIG. 2A, a pilot signal of the user $U_A$ is allocated to the $1^{st}$, $3^{rd}$, $5^{th}$, $7^{th}$, $9^{th}$ and $11^{th}$ subcarriers in a frequency domain F201. A pilot signal of the user $U_B$ is allocated to the $12^{th}$, $14^{th}$, $16^{th}$, $18^{th}$, $20^{th}$ and $22^{nd}$ subcarriers in a frequency domain F202. A pilot signal of the user $U_C$ is allocated to the $23^{rd}$, $25^{th}$, $27^{th}$, $29^{th}$, $31^{st}$ and $33^{rd}$ subcarriers in a frequency domain F203.

A pilot signal of the user $U_D$ is allocated to the $34^{th}$, $36^{th}$, $38^{th}$, $40^{th}$, $42^{nd}$ and $44^{th}$ subcarriers in the frequency domain F203. A pilot signal of the user $U_E$ is allocated to the $45^{th}$, $47^{th}$, $49^{th}$, $51^{st}$, $53^{rd}$ and $55^{th}$ subcarriers in a frequency domain F204. A pilot signal of the user $U_F$ is allocated to the $56^{th}$, $58^{th}$, $60^{th}$, $62^{nd}$, $64^{th}$ and $66^{th}$ subcarriers in a frequency domain F205.

As shown in FIG. 2B, a data signal of the user $U_A$ is allocated to $1^{st}$ to $12^{th}$ subcarriers in the frequency domain F201. A data signal of the user $U_B$ is allocated to the $11^{th}$ to $22^{nd}$ subcarriers in the frequency domain F202. A data signal of the user $U_C$ is allocated to the $23^{rd}$ to $34^{th}$ subcarriers in the frequency domain F203.

A data signal of the user $U_D$ is allocated to the $33^{rd}$ to $44^{th}$ subcarriers in the frequency domain F204. A data signal of the user $U_E$ is allocated to the $45^{th}$ to $56^{th}$ subcarriers in the frequency domain F205. A data signal of the user $U_F$ is allocated to the $55^{th}$ to $66^{th}$ subcarriers in the frequency domain F206.

That is, the user $U_A$ and the user $U_B$ are allocated to the $11^{th}$ and $12^{th}$ subcarriers SC11 and SC12 in an overlapping manner. The user $U_C$ and the user $U_D$ are allocated to the $33^{rd}$ and $34^{th}$ subcarriers SC33 and SC34 in an overlapping manner. The user $U_E$ and the user $U_F$ are allocated to the $55^{th}$ and $56^{th}$ subcarriers SC55 and SC56 in an overlapping manner.

As shown in FIGS. 2A and 2B, it is possible to uniformly maintain the number of overlapping subcarriers between subchannels by arranging subcarriers overlapping only with one adjacent subchannel.

Figure 15A:
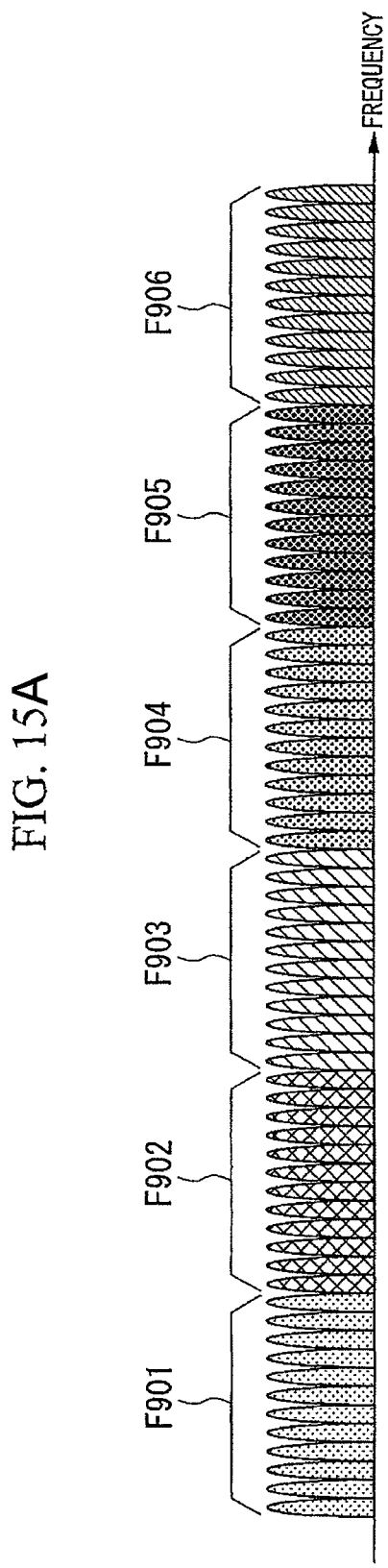
FIG. 15A is a diagram showing an example of localized mapping.

It is possible to accommodate the same number of users as in the case of FIG. 15A in a narrower band (a small number of subcarriers). That is, 72 subcarriers are used in total in FIG. 15A, and 66 subcarriers are used in the total frequency domains in FIG. 2B. Accordingly, in this embodiment, it is possible to improve frequency use efficiency.

Figure 3A:
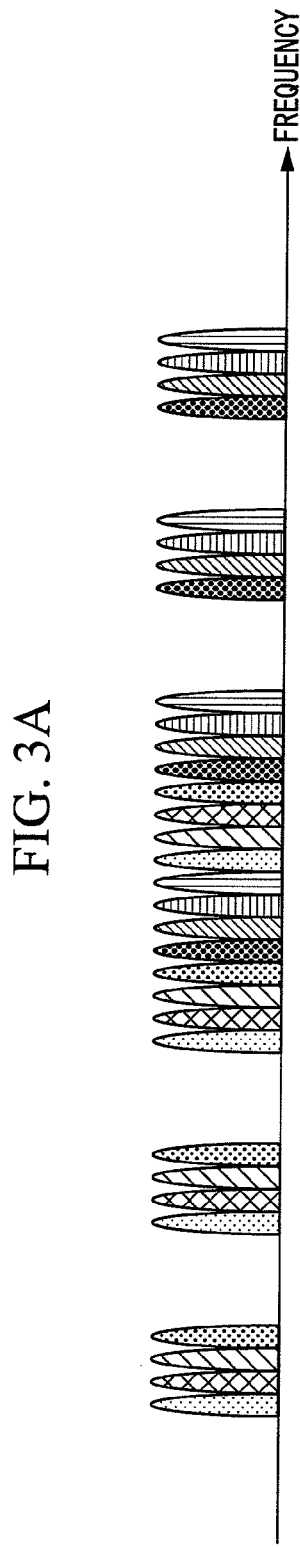
FIG. 3A is a diagram showing a further another example of an arrangement of pilot signals, according to the first embodiment of the present invention.

FIG. 3A is a diagram showing a further another example of an arrangement of pilot signals according to the first embodiment of the present invention. FIG. 3B is a diagram showing a further another example of an arrangement of data signals according to the first embodiment of the present invention. In FIGS. 3A and 3B, the horizontal axis is the frequency. In FIG. 3B, 56 subcarriers are arranged in the frequency direction. In the description of FIGS. 3A and 3B, the case of allocating the 56 subcarriers to 8 users $U_A$, $U_B$, $U_C$, $U_D$, $U_E$, $U_F$, $U_G$ and $U_H$ will be described.

FIG. 3A shows an example of a distributed arrangement of pilot signals. FIG. 3A shows pilot signals arranged to maintain a low PAPR characteristic. As shown in FIG. 3B, even in the distributed arrangement, when a data signal is transmitted, several subcarriers at an end of the subchannel are used in an overlapping manner with another subchannel (user).

As shown in FIG. 3A, a pilot signal of the user $U_A$ is allocated to the $5^{th}$, $13^{th}$, $21^{st}$ and $29^{th}$ subcarriers. A pilot signal of the user $U_B$ is allocated to the $6^{th}$, $14^{th}$, $22^{nd}$ and $31^{st}$ subcarriers. A pilot signal of the user $U_C$ is allocated to the $7^{th}$, $15^{th}$, $23^{rd}$ and $30^{th}$ subcarriers. A pilot signal of the user $U_D$ is allocated to the $8^{th}$, $16^{th}$, $24^{th}$ and $32^{th}$ subcarriers.

A pilot signal of the user $U_E$ is allocated to the $25^{th}$, $33^{rd}$, $41^{st}$ and $49^{th}$ subcarriers. A pilot signal of the user $U_E$ is allocated to the $26^{th}$, $34^{th}$, $42^{nd}$ and $50^{th}$ subcarriers. A pilot signal of the user $U_G$ is allocated to the $27^{th}$, $35^{th}$, $43^{rd}$ and $51^{st}$ subcarriers. A pilot signal of the user $U_H$ is allocated to the $28^{th}$, $36^{th}$, $44^{th}$ and $52^{nd}$ subcarriers.

As shown in FIG. 3B, a data signal of the user $U_A$ is allocated to the $1^{st}$, $5^{th}$, $9^{th}$, $13^{th}$, $17^{th}$, $21^{st}$, $25^{th}$ and $29^{th}$ subcarriers. A data signal of the user $U_B$ is allocated to the $2^{nd}$, $6^{th}$, $10^{th}$, $14^{th}$, $18^{th}$, $22^{nd}$, $26^{th}$ and $30^{th}$ subcarriers.

A data signal of the user $U_C$ is allocated to the $3^{rd}$, $7^{th}$, $11^{th}$, $15^{th}$, $19^{th}$, $23^{rd}$, $27^{th}$ and $31^{st}$ subcarriers. A data signal of the user $U_D$ is allocated to the $4^{th}$, $8^{th}$, $12^{th}$, $16^{th}$, $20^{th}$, $24^{th}$, $28^{th}$ and $32^{nd}$ subcarriers.

A data signal of the user $U_E$ is allocated to the $25^{th}$, $29^{th}$, $33^{rd}$, $37^{th}$, $41^{st}$, $45^{th}$, $49^{th}$ and $53^{rd}$ subcarriers. A data signal of the user $U_F$ is allocated to the $26^{th}$, $30^{th}$, $34^{th}$, $38^{th}$, $42^{nd}$, $50^{th}$ and $54^{th}$ subcarriers.

A data signal of the user $U_G$ is allocated to the $27^{th}$, $31^{st}$, $35^{th}$, $39^{th}$, $43^{rd}$, $47^{th}$, $51^{st}$ and $55^{th}$ subcarriers. A data signal of the user $U_H$ is allocated to the $28^{th}$, $32^{nd}$, $36^{th}$, $40^{th}$, $44^{th}$, $48^{th}$, $52^{nd}$ and $56^{th}$ subcarriers.

That is, the user $U_A$ and the user $U_E$ are allocated to the $25^{th}$ and $29^{th}$ subcarriers SC25 and SC29 in an overlapping manner. The user $U_B$ and the user $U_F$ are allocated to the $26^{th}$ and $30^{th}$ subcarriers SC26 and SC30 in an overlapping manner.

The user $U_C$ and the user $U_G$ are allocated to the $27^{th}$ and $31^{st}$ subcarriers SC27 and SC31 in an overlapping manner. The user $U_D$ and the user $U_H$ are allocated to the $28^{th}$ and $32^{nd}$ subcarriers SC28 and SC32 in an overlapping manner.

Figure 15B:
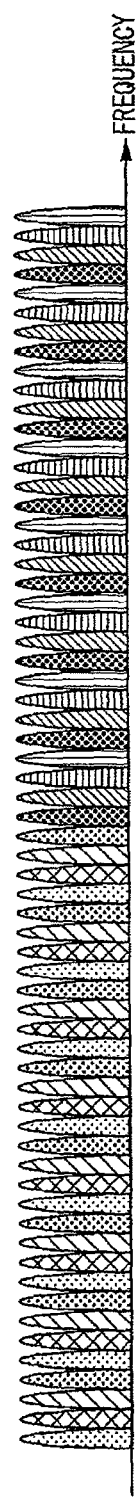
FIG. 15B is a diagram showing an example of distributed mapping.
Figure 16:
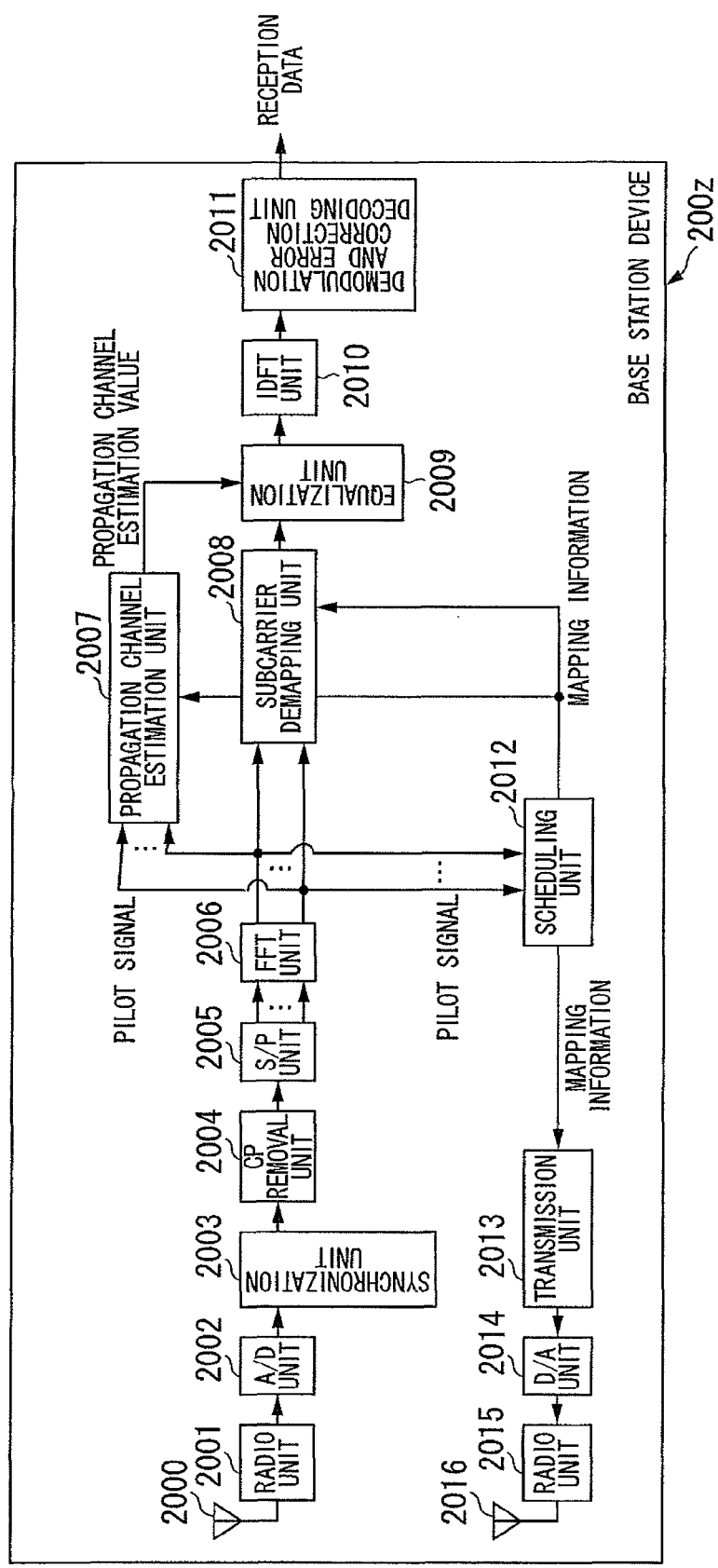
FIG. 16 is a schematic block diagram showing the configuration of a conventional base station device 200$z$.

It is possible to accommodate the same number of users in a narrower band (a small number of subcarriers) while obtaining a frequency diversity gain through such an arrangement. For example, 64 subcarriers are used in total in FIG. 15B and only 56 subcarriers are used in total in FIGS. 3A and 3B.

The case where the number of overlapping subcarriers is different but all subchannels have subcarriers overlapping with adjacent subchannels has been described in the above embodiment, but the present invention is not limited thereto. For example, a subchannel which does not use subcarriers in an overlapping manner with an adjacent subchannel may be partially included. A subchannel which does not overlap with the adjacent subchannel can be used, for example, upon MIMO transmission.

The arrangement of several subchannels only in the frequency domain without considering a frame indicating a temporal break has been described in this embodiment, but the present invention is not limited thereto. In a system using a plurality of time frames, different subchannels may be arranged in time frames so that a different number of subcarriers overlap between subchannels in each time frame. For example, the number of subcarriers overlapping between subchannels in one frame may be 2, and the number of subcarriers overlapping between subchannels in another frame may be 4. In this case, a time frame using the SC-FDMA scheme of the related art without any overlapping subcarrier may be included.

(Second Embodiment)

Next, the configuration of a base station device 200b in a communication system according to a second embodiment of the present invention will be described.

Figure 4:
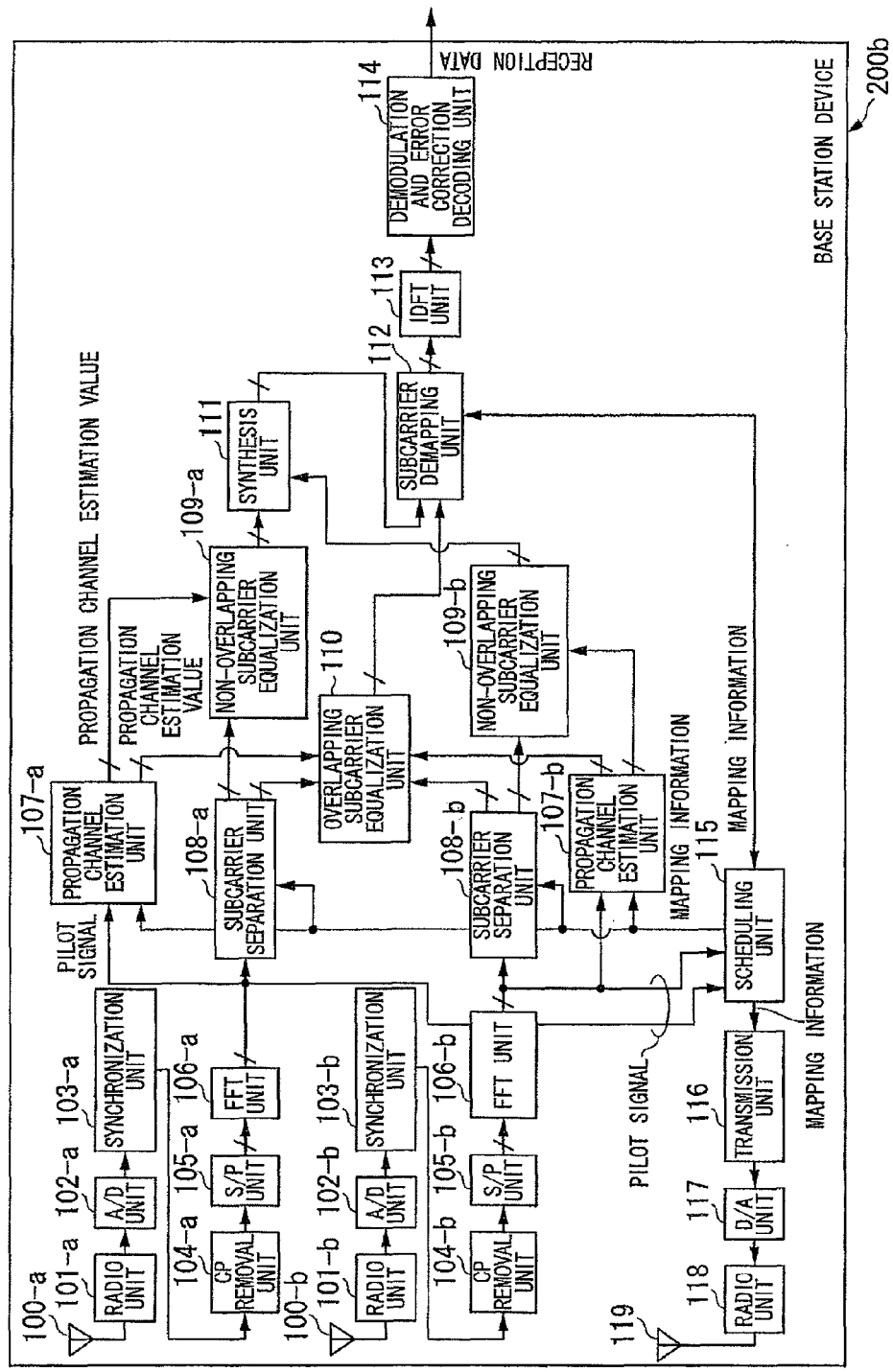
FIG. 4 is a schematic block diagram showing the configuration of a base station device 200$b$ according to a second embodiment of the present invention.

FIG. 4 is a schematic block diagram showing the configuration of the base station device 200b according to the second embodiment of the present invention. As shown in FIG. 4, the base station device 200b according to this embodiment includes reception antennas 100-a and 100-b, radio units 101-a and 101-b, A/D conversion units 102-a and 102-b, synchronization units 103-a and 103-b, CP removal units 104-a and 104-b, S/P conversion units 105-a and 105-b, FFT units 106-a and 106-b, propagation channel estimation units 107-a and 107-b, subcarrier separation units 108-a and 108-b, non-overlapping subcarrier equalization units 109-a and 109-b, an overlapping subcarrier equalization unit 110, a synthesis unit 111, a subcarrier demapping unit 112, an IDFT unit 113, a demodulation and error correction decoding unit 114, a scheduling unit 115, a transmission unit 116, a D/A unit 117, a radio unit 118 and a transmission antenna 119.

In the base station device 200b, the radio units 101-a and 101-b respectively convert signals received by the reception antennas 100-a and 100-b into an A/D convertible frequency. Thereafter, the A/D conversion units 102-a and 102-b perform conversion from analog signals to digital signals.

Next, the synchronization units 103-a and 103-b establish symbol synchronization. The CP removal units 104-a and 104-b remove a cyclic prefix from every symbol. Thereafter, the S/P conversion units 105-a and 105-b perform conversion from serial signals into parallel signals. The FFT units 106-a and 106-b respectively perform conversion from time domain signals into frequency domain signals.

Pilot signals for propagation channel estimation converted into frequency domain signals are output to the propagation channel estimation units 107-a and 107-b, by which propagation channel estimations are respectively performed. The pilot signal is known between a transmitter and a receiver. It is possible to obtain a propagation channel change by complex-dividing the received pilot signal by a signal upon transmission. When pilot signals are arranged as in FIGS. 1A, 2A and 3A, the propagation channel estimation units 107-a and 107-b perform interpolation between subcarriers. It is possible to perform the respective propagation channel estimations in the situation where there is no influence of interference from an adjacent subchannel by not overlapping the pilot signal between users (subchannels).

Data signals are respectively output from the FFT units 106-a and 106-b to the subcarrier separation units 108-a and 108-b. The subcarrier separation units 108-a and 108-b separate subcarriers used in an overlapping manner with other subchannels (users) and subcarriers not used in an overlapping manner.

For example, the subcarriers are separated into the subcarriers SC11 and SC12, the subcarriers SC21 and SC22, the subcarriers SC31 and SC32, the subcarriers SC41 and SC42, the subcarriers SC51 and SC52 and the subcarriers SC61 and SC62 of FIG. 1B and other subcarriers. The subcarriers SC11, SC12, SC21, SC22, SC31, SC32, SC41, SC42, SC51, SC52, SC61 and SC62 used in an overlapping manner with other subchannels are output to the overlapping subchannel equalization unit 110. On the other hand, the subcarriers not used in an overlapping manner with other subchannels are respectively output to the non-overlapping equalization units 109-a and 109-b.

Propagation channel estimation values respectively estimated in the propagation channel estimation units 107-a and 107-b and subcarriers corresponding to data signals separated by the subcarrier separation units 108-a and 108-b are respectively output to the overlapping subcarrier equalization unit 110 and the non-overlapping subcarrier equalization units 109-a and 109-b, and are used for respective equalization processes.

Corresponding subcarrier communication is equivalent to one-to-one communication. Accordingly, the non-overlapping subcarrier equalization units 109-a and 109-b perform single input single output (SISO) equalization processes using the data signals and the propagation channel estimation values.

Also, corresponding subcarrier communication may be regarded to be spatially multiplexed using a plurality of transmission/reception antennas. Accordingly, the overlapping subcarrier equalization unit 110 performs a multi input multi output (MIMO) signal separation and equalization process.

Here, the MIMO signal separation and equalization process in the overlapping subcarrier equalization unit 110 will be described. First, it is assumed that the received signal vector of the frequency domain is R, the propagation channel matrix is Ξ and the transmitted signal vector is S. When the noise component is neglected for simplification, Equation (1) is established.

$$R = \Xi S \quad (1)$$

For simplification, a process for two subcarriers (the 11$^{th}$ and 12$^{th}$ subcarriers SC11 and SC12) used in an overlapping manner by the user $U_A$ and the user $U_B$ and two subcarriers (the 21$^{st}$ and 22$^{nd}$ subcarriers SC21 and SC22) used in an overlapping manner by the user $U_B$ and the user $U_C$ in FIG. 1B is performed. At this time, R, Ξ, and S are respectively expressed as shown in Equations (2) to (4).

$$R = \begin{bmatrix} R_a(11) \\ R_a(12) \\ R_a(21) \\ R_a(22) \\ R_b(11) \\ R_b(12) \\ R_b(21) \\ R_b(22) \end{bmatrix} \quad (2)$$

$$\Xi = \begin{bmatrix} \Xi_{aA}(11) & 0 & 0 & 0 & \Xi_{aB}(11) & 0 & 0 & 0 \\ 0 & \Xi_{aA}(12) & 0 & 0 & 0 & \Xi_{aB}(12) & 0 & 0 \\ 0 & 0 & \Xi_{aB}(21) & 0 & 0 & 0 & \Xi_{aC}(21) & 0 \\ 0 & 0 & 0 & \Xi_{aB}(22) & 0 & 0 & 0 & \Xi_{aC}(22) \\ \Xi_{bA}(11) & 0 & 0 & 0 & \Xi_{bB}(11) & 0 & 0 & 0 \\ 0 & \Xi_{bA}(12) & 0 & 0 & 0 & \Xi_{bB}(12) & 0 & 0 \\ 0 & 0 & \Xi_{bB}(21) & 0 & 0 & 0 & \Xi_{bC}(21) & 0 \\ 0 & 0 & 0 & \Xi_{bB}(22) & 0 & 0 & 0 & \Xi_{bC}(22) \end{bmatrix} \quad (3)$$

-continued $$S = \begin{bmatrix} S_A(11) \\ S_A(12) \\ S_B(21) \\ S_B(22) \\ S_B(11) \\ S_B(12) \\ S_C(21) \\ S_C(22) \end{bmatrix} \quad (4)$$

In these equations, the numbers within brackets are subcarrier numbers shown in FIG. 1B, and the subscripts indicate indices of the transmission users $U_A$, $U_B$ and $U_C$ and the reception antennas 100-a and 100-b.

The two subscripts of $\Xi$ indicate the combination of the reception antenna and the transmission user. For example, $\Xi_{b,A}$ indicates the propagation channel from the user $U_A$ to the reception antenna 100-b. The overlapping subcarrier equalization unit 110 reproduces a transmission signal vector by multiplying a received signal R of the subcarriers used in an overlapping manner with other subchannels by the inverse matrix of $\Xi$, as shown in Equation (5).

$$S = \Xi^{-1} R \quad (5)$$

Calculation in the overlapping subcarrier equalization unit 110 in this embodiment is based on zero forcing (ZF), but is not limited thereto. For example, it is possible to further improve reception characteristics by carrying out the calculation based on a minimum mean square error (MMSE) criterion which minimizes the square error of a signal after equalization and the transmission signal.

A signal obtained through the signal separation and equalization process in the overlapping subcarrier equalization unit 110 is output to the subcarrier demapping unit 112. Signals (subcarriers which do not overlap with other subchannels) obtained through the respective equalization processes in the non-overlapping subcarrier equalization units 109-a and 109-b are synthesized with the respective subcarriers by the synthesis unit 111.

This synthesis process may use a method of calculating the average for each subcarrier and may use a method of performing weighting corresponding to the reception level.

The synthesis signal from the synthesis unit 111 is output to the subcarrier demapping unit 112. The subcarrier demapping unit 112 assembles an output signal from the overlapping subcarrier equalization unit 110 and an output signal from the synthesis unit 111 into a signal of each subchannel (user), and outputs a signal of a subchannel (user) unit to the IDFT unit 113.

The demodulation and error correction decoding unit 114 performs a demodulation/decoding process on a time domain signal obtained through conversion in the IDFT unit 113, and reproduces transmission data for each subchannel (user). IDFT units 113 or demodulation and error correction decoding units 114 may be provided by the number of subchannels. In this case, respective subchannel data may be reproduced in parallel.

Pilot signals for reception level measurement are output from the FFT units 106-a and 106-b to the scheduling unit 115. Based on results of the reception level measurement using the pilot signals, the scheduling unit 115 performs scheduling considering the propagation situation of each terminal device. The scheduling is a process of deciding which user is allocated to which subchannel.

After mapping information determined by the scheduling unit 115 is modulated by the transmission unit 116 and processed by the D/A conversion unit 117 and the radio unit 118, the resultant mapping information is transmitted from the transmission antenna 119 to each terminal device. This mapping information is used when the terminal device transmits a signal in the next and subsequent frames.

The mapping information is used for the subcarrier separation units 108-a and 108-b to separate subcarriers when a corresponding frame is received. Also, the mapping information is used for the subcarrier demapping unit 112 to assemble subcarriers for each subchannel.

Such a configuration of the base station device 200b enables signals transmitted from respective users to be respectively separately demodulated even though some subcarriers within a subchannel are used in an overlapping manner with a user allocated to another subchannel.

While the equalization processes are separately applied to subcarriers used in an overlapping manner among subchannels and the other subcarriers in this embodiment, the present invention is not limited thereto. For example, the overlapping subcarriers may be separated, and the separated overlapping subcarriers and the other non-overlapping subcarriers may be assembled and collectively equalized.

Since this process is performed on the already separated overlapping and non-overlapping subcarriers, the process becomes a process like SISO equalization.

Third Embodiment

In the second embodiment, the base station device 200b (FIG. 4) has the plurality of reception antennas 100-a and 100-b. The signal separation has been performed by MIMO-processing the subcarriers used in an overlapping manner between the subchannels.

On the other hand, in the present embodiment, the case where signal separation can be performed even when the number of reception antennas is 1, by using non-linear iterative equalization, will be described.

Figure 5:
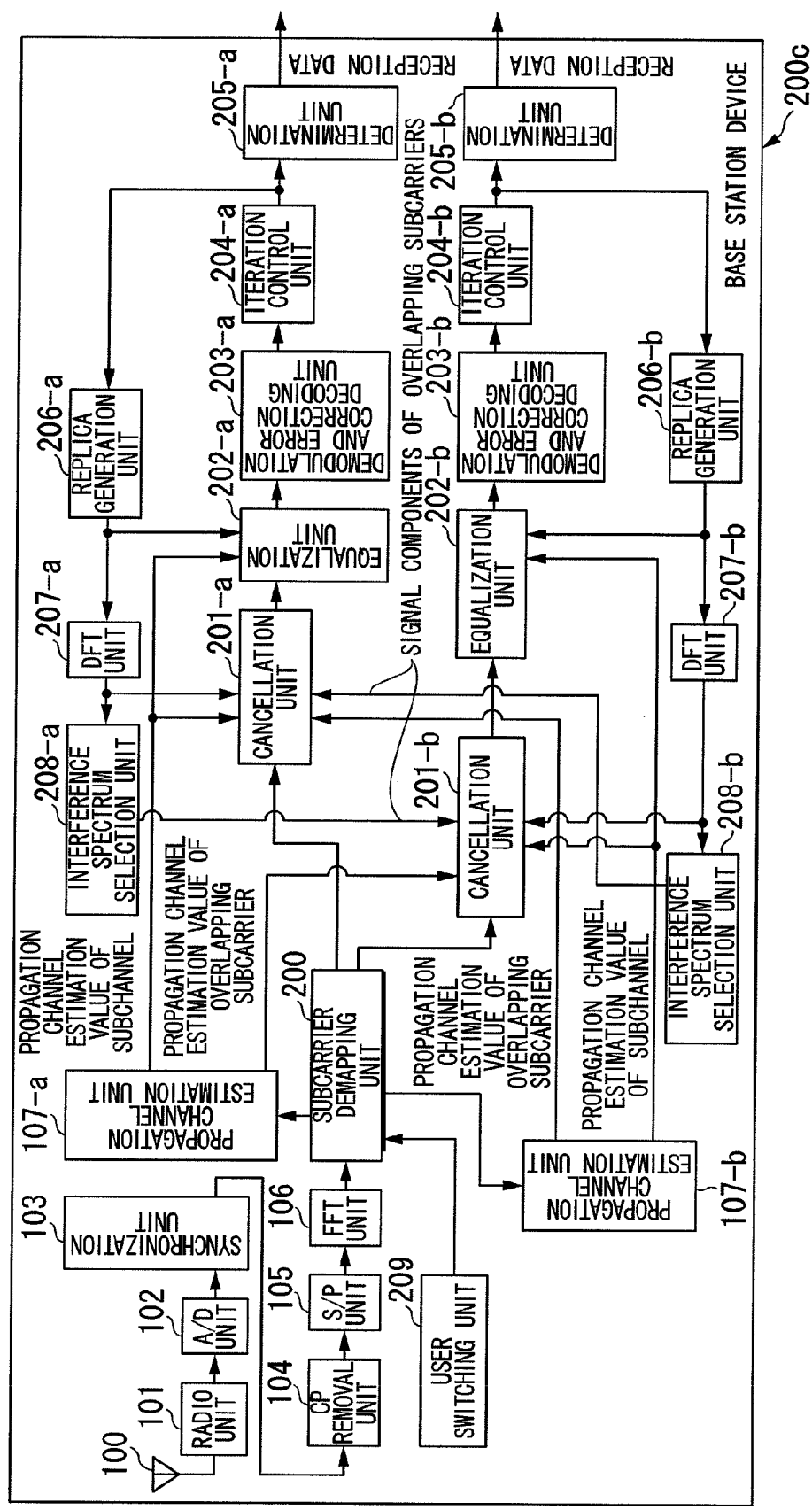
FIG. 5 is a schematic block diagram showing the configuration of a base station device 200$c$ according to a third embodiment of the present invention.

FIG. 5 is a schematic block diagram showing the configuration of a base station device 200c according to the third embodiment of the present invention. The same reference numerals are assigned to the same blocks as those of the base station device 200b of FIG. 4. Since the transmission system is the same as that shown in FIG. 4, the illustration thereof is omitted.

As shown in FIG. 5, the reception system of the base station device 200c according to the present embodiment includes a reception antenna 100, a radio unit 101, an A/D conversion unit 102, a synchronization unit 103, a CP removal unit 104, an S/P conversion unit 105, an FFT unit 106, propagation channel estimation units 107-a and 107-b, a subcarrier demapping unit 200, cancellation units 201-a and 201-b, equalization units 202-a and 202-b, demodulation and error correction decoding units 203-a and 203-b, iteration control units 204-a and 204-b, determination units 205-a and 205-b, replica generation units 206-*a* and 206-*b*, DFT units 207-*a* and 207-*b*, interference spectrum selection units 208-*a* and 208-*b*, and a user switching unit 209.

A signal received by the base station device 200*c* is subjected to the same process as in the base station device 200*b* shown in FIG. 4, by units including from the radio unit 101 to the FFT unit 106, and converted into a frequency domain signal. The subcarrier demapping unit 200 divides the signal into signals of respective subchannels (users).

This is a process of, for example, in the case of subchannel arrangements shown in FIGS. 2A and 2B, assembling the subcarriers to which signals of the user $U_A$ and the user $U_B$ are allocated, and outputting the signal of the user $U_A$ to the cancellation unit 201-*a* and the signal of the user $U_B$ to the cancellation unit 201-*b*.

At this time, the user switching unit 209 selects a user. Such a process is also performed for pilot signals for propagation channel estimation. A pilot signal of the user $U_A$ is output to the propagation channel estimation unit 107-*a*, and a pilot signal of the user $U_B$ is output to the propagation channel estimation unit 107-*b*, so that respective propagation channel estimations are performed. In this regard, even in this embodiment, the pilot signal of each user is arranged as in FIGS. 1A, 2A and 3A, and propagation channel estimation can be performed in the situation where there is no influence of interference from an adjacent subchannel.

In an output signal of the subcarrier demapping unit 200, the signals of the user $U_A$ and the user $U_B$ overlap in some subcarriers and interfere with each other. Accordingly, the signals are input into the cancellation units 201-*a* and 201-*b*, which cancel replicas of interference components.

In this regard, the cancellation units 201-*a* and 201-*b* cancel replicas of desired signals as well as the replicas of the interference components, and calculate the remaining signal components in this embodiment. Among these, the replicas of the desired signals are respectively generated by the replica generation units 206-*a* and 206-*b* based on reliabilities of their own signals. The replica of the interference component is generated based on reliability of another signal used in an overlapping manner (the user $U_B$ when viewed from the user $U_A$).

For the replicas of the interference signals, only the subcarriers used in an overlapping manner (here, the 11$^{th}$ and 12$^{th}$ subcarriers SC11 and SC12 of FIG. 2B) may be subjected to the cancellation. Thus, the interference spectrum selection units 208-*a* and 208-*b* select only the overlapping subcarriers.

Here, the reason why all replicas, including even desired signals to be extracted, are cancelled is as follows. That is, when cancellation and equalization are iterated by leaving only the desired signals so that the equalization units 202-*a* and 202-*b* calculate inverse matrices, it is necessary to carry out an inverse matrix calculation the number of a desired signal included within a block. On the other hand, a residual is commonly treated within a block by inputting all cancelled residual components, and all weights can be calculated in one inverse matrix calculation within the block. Accordingly, a calculation amount associated with the inverse matrix calculation is reduced by separately inputting and reconfiguring a replica.

However, since no signal replica is generated in a first process, the cancellation process is not performed and the received signals are directly output to the equalization units 202-*a* and 202-*b*.

The equalization units 202-*a* and 202-*b* perform equalization calculations on outputs of the cancellation units 201-*a* and 201-*b*. For the equalization calculations, an equalization method based on an MMSE criterion is used, but, for example, a ZF method in which an inverse matrix of a propagation channel is multiplied may be used.

The equalization units 202-*a* and 202-*b* equalize signals using the residual components as outputs of the cancellation units 201-*a* and 201-*b*, the propagation channel estimation values of the desired signals, and the replicas of the desired signals.

Specifically, the equalization units 202-*a* and 202-*b* calculate optimal weights from the residual components or the propagation channel estimation values and the signal replicas, and output final time-axis signals after the equalization multiplied by the optimal weights. However, since no replica is input in a first process, this is the same as MMSE equalization of the related art in which no cancellation is performed.

The demodulation and error correction decoding units 203-*a* and 203-*b* demodulate and error-correct the equalized signals. Log likelihood ratios (LLRs) of code bits having high reliability are output from the demodulation and error correction decoding units 203-*a* and 203-*b*.

According to the log likelihood ratios output from the demodulation and error correction decoding units 203-*a* and 203-*b*, the iteration number control units 204-*a* and 204-*b* control whether or not a process is to be iterated. When the process is iterated, the LLRs are respectively input into the replica generation units 206-*a* and 206-*b* for generating signal replicas.

As described above, the replica generation units 206-*a* and 206-*b* generate signal replicas proportional to the reliabilities thereof in response to the LLRs of the code bits. The generated signal replicas are input into the equalization units 202-*a* and 202-*b* to reconfigure desired signals upon equalization. Simultaneously, the DFT units 207-*a* and 207-*b* respectively convert the signal replicas into frequency domain signals so as to select only interference spectra overlapping with the desired signals.

As described above, the interference spectrum selection units 208-*a* and 208-*b* select only subcarriers (the 11$^{th}$ and 12$^{th}$ subcarriers SC11 and SC12 of FIG. 2B) overlapping between the user $U_A$ and the user $U_B$, which are used to cancel a mutual interference component.

These processes are performed on the user $U_A$ and the user $U_B$ in parallel. The process is iterated the given number of times controlled by the iteration control units 204-*a* and 204-*b*. The determination units 205-*a* and 205-*b* perform hard decisions. Decoded data is obtained by these processes.

In this embodiment, the user $U_A$ and the user $U_B$ described with reference to FIGS. 2A and 2B are used as a target. After signals of the user $U_A$ and the user $U_B$ are reproduced, the user switching unit 209 selects other users (for example, a combination of the user $U_C$ and the user $U_D$ or a combination of the user $U_E$ and the user $U_F$), and the same process as the above-described process is iterated.

In this embodiment, the base station device 200*c* which sequentially selects two users using overlapping subcarriers and performs a process for the selected two users has been described. Processes may be simultaneously performed for all users by providing the cancellation units 201-*a* and 201-*b*, the equalization units 202-*a* and 202-*b*, the demodulation and error correction decoding units 203-*a* and 203-*b*, the replica generation units 206-*a* and 206-*b*, and so on whose number is the same as the number of subchannels.

The given number of iterations may be predetermined or the iteration number may be adaptively controlled, such as iterations until there is no error in results of the demodulation and error correction decoding units 203-*a* and 203-*b*.

If there is no error in an error correction result for at least one user, it is possible to generate a complete replica by generating a replica from the decoded bit, not the LLR.

In single carrier transmission used in this embodiment, a transmitted signal is a signal in which an, information signal is spread over the entire subchannel. Thus, even though some subcarriers within a subchannel are used in an overlapping manner with a user allocated to another subchannel, it is possible to perform demodulation at a certain degree of accuracy from a signal of a subcarrier which is not used in an overlapping manner with another user. Further, after a replica is generated according to reliability, it is possible to separate a signal even in one reception antenna by iterating a non-linear process of mutually cancelling subcarriers serving as interference to another side. At this time, the demodulation accuracy of each signal is improved every time the number of iterations is increased. In response thereto, the accuracy of a replica to be cancelled as interference is increased. Thus, it is possible to remove mutual interference by setting the sufficient iteration number, to the given number of times.

When it is possible to completely remove mutual interference by the above-described configuration, it is possible to achieve better reception characteristics as compared to the case where reception is performed by the base station device 200*b* (FIG. 4) in the second embodiment.

In FIG. 5, the case where two users are selected and signals of the two selected users are processed in parallel has been described. However, the cancellation units 201-*a* and 201-*b* and subsequent blocks may be embodied as single entities, respectively, by performing serial processing while alternately switching users as targets. An example of such a base station device 200*c'* is shown in FIG. 6.

Figure 6:
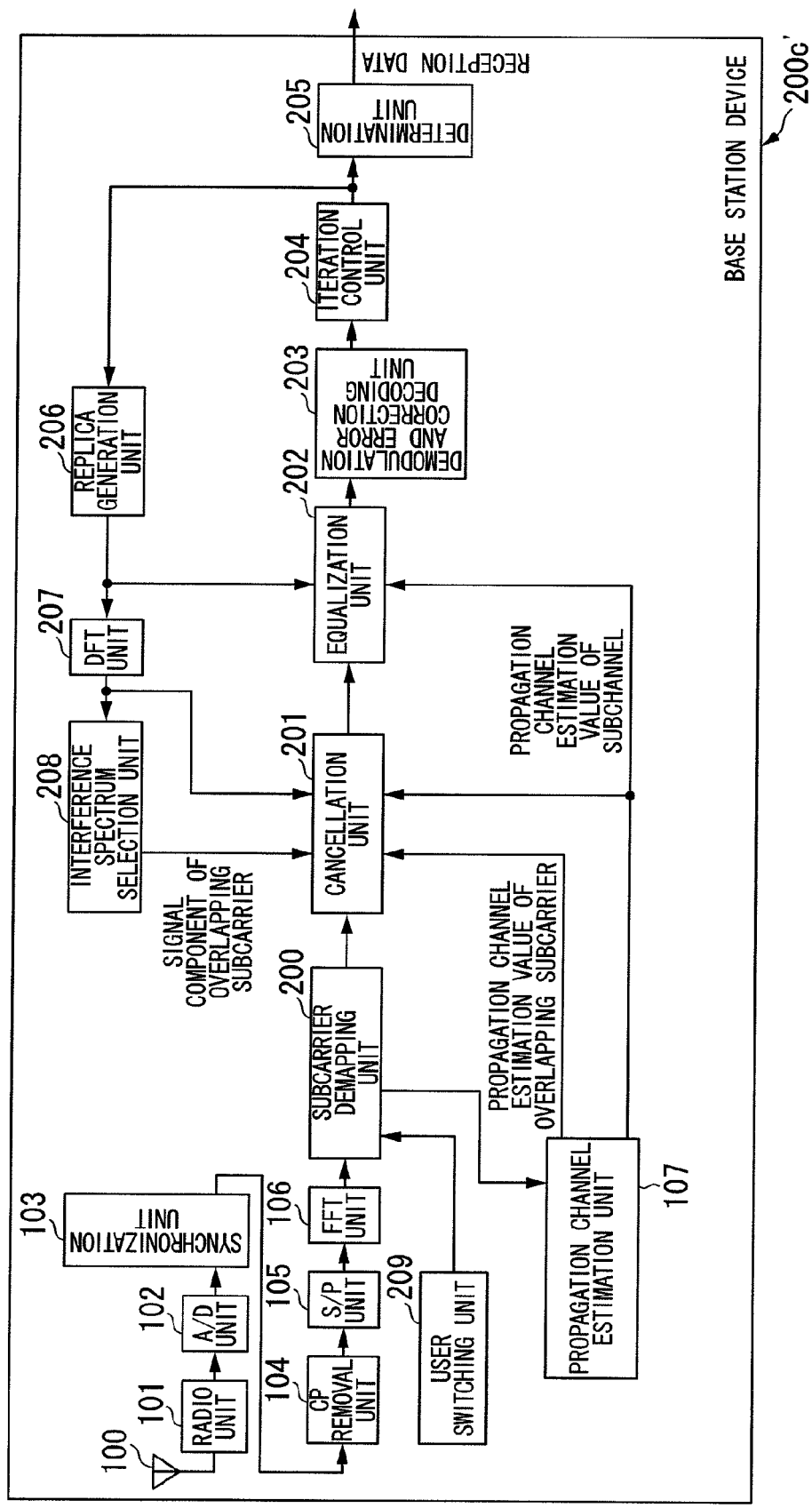
FIG. 6 is a schematic block diagram showing the configuration of a base station device 200$c'$ according to the third embodiment of the present invention.

FIG. 6 is a schematic block diagram showing the configuration of the base station device 200*c'* according to the third embodiment of the present invention. In FIG. 6, the same reference numerals are assigned to blocks having same functions as those of FIG. 5, and the blocks perform substantially the same processes as those of FIG. 5.

However, a cancellation unit, an equalization unit, a demodulation and error correction decoding unit, a replica generation unit, and so on are one system. Thus, parallel processing of signals of two subchannels (users) as in the configuration shown in FIG. 5 is not performed, and a signal of every subchannel is sequentially selected by a user switching unit 209 and processing is performed on every subchannel.

When such serial processing is performed in the situation where the number of iterations of processing is limited by a problem such as processing delay, the characteristic may be changed by the order of selecting processed subchannels (users).

As such a selection order for processing, sequential selection from a user having higher reception power can be used. When the subchannel arrangements shown in FIGS. 1A and 1B are used, the number of subcarriers used in an overlapping manner with another user differs according to allocated subchannels.

Since only one subchannel is adjacent to subchannels at ends (subchannels used by the user $U_A$ and the user $U_G$ in FIGS. 1A and 1B), the subchannels at the ends have a smaller number of overlapping subcarriers than other subchannels not at the ends. In this case, processing is performed sequentially from signals of users allocated to the subchannels at the ends in which interference is less. Accordingly, better characteristics are obtained as compared with the case where processing is performed sequentially from a signal of a user allocated to the other subchannels not at the ends.

Accordingly, in the subchannel arrangements shown in FIGS. 1A and 1B, a signal of the user $U_A$ is first processed and then a signal of the user $U_B$ is processed using a replica generated from the demodulated signal of the user $U_A$.

However, when the signal of the user $U_A$ is processed, a replica is not created and thus a cancellation process is not performed. Processing may be sequentially performed from either of the ends in the order of the user $U_C$ after the user $U_B$ and the user $U_D$ after the user $U_C$. Also, processing may be alternately performed from both ends in the order of the user $U_G$ after the user $U_A$ and the user $U_B$ after the user $U_G$.

When processing is alternately performed from both ends, interference replicas in overlapping subcarriers at both ends of the subchannel can be created upon processing of a signal of the user $U_D$, and thus accurate demodulation can be performed.

Signals of the user $U_C$ and the user $U_E$ are processed using a replica of the user $U_D$. Further, a signal of the user $U_B$ is processed using a replica of the user $U_C$, and a signal of the user $U_F$ is processed using a replica of the user $U_E$. It is possible to achieve better characteristics by iterating the above-described processing. Also, processing may be sequentially performed from a channel, not the subchannel at the end, having an adjacent channel to which a user is not allocated.

(Fourth Embodiment)

Figure 14:
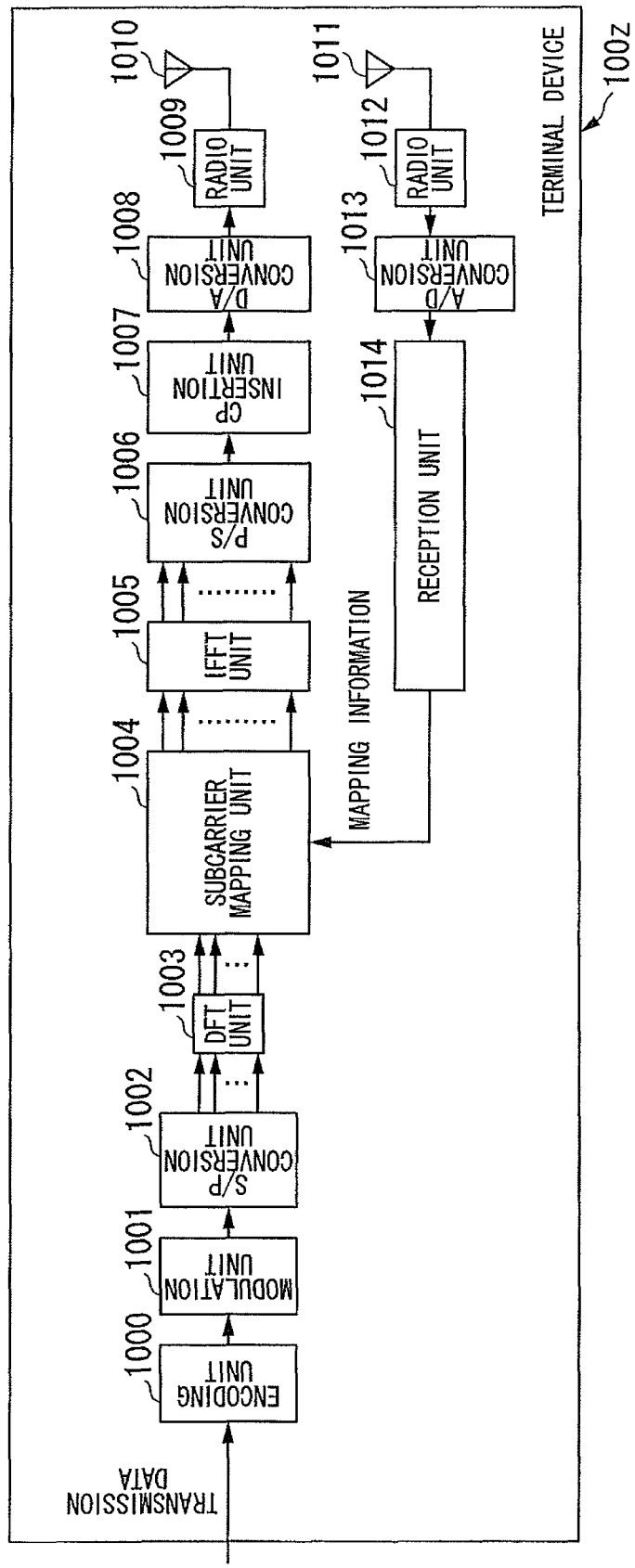
FIG. 14 is a schematic block diagram showing the configuration of a terminal 100$z$ when an SC-FDMA scheme is used for uplink transmission.

Next, a communication system according to a fourth embodiment of the present invention will be described. The communication system includes a terminal device (also referred to as a first communication device) and a base station device (also referred to as a second communication device). Since the terminal device in the fourth embodiment of the present invention may be the same terminal device as shown in FIG. 14, description thereof is omitted. Since the base station device in the fourth embodiment of the present invention may be the same base station as the base station device according to the second or third embodiment, description thereof is omitted. In the present embodiment, subcarrier allocation different from that in the above-described embodiments will be described.

When the iterative process as illustrated in the third embodiment is performed, no replica is generated in a first process (a process of an initially demodulated subchannel) and thus demodulation is performed in the state in which much interference is included. When a signal spread over the entire subchannel as in single carrier transmission used in the present embodiment is a target, it is possible to perform demodulation with a certain degree of accuracy from a signal of a subcarrier signal not used in an overlapping manner with another user.

However, when there are subcarriers used in an overlapping manner in a system in which modulation signals are respectively allocated to subcarriers as in the OFDMA scheme, better characteristics may not be obtained.

Accordingly, single carrier transmission capable of suppressing the PAPR characteristic to be low may be considered to be used in a terminal device requiring high transmission power since the terminal device is away from a base station device. Also, the OFDMA scheme in which adaptive modulation or the like is possible in subcarrier units may be considered to be used in a terminal device which does not require high transmission power since the terminal device is located near a base station device. Thus, a system which performs switching is assumed. In the case of switching to the OFDMA scheme, a configuration in which several subcarriers within a subchannel as shown in FIGS. 1A to 3B are used in an overlapping manner with another subchannel is not preferred.

Figure 7:
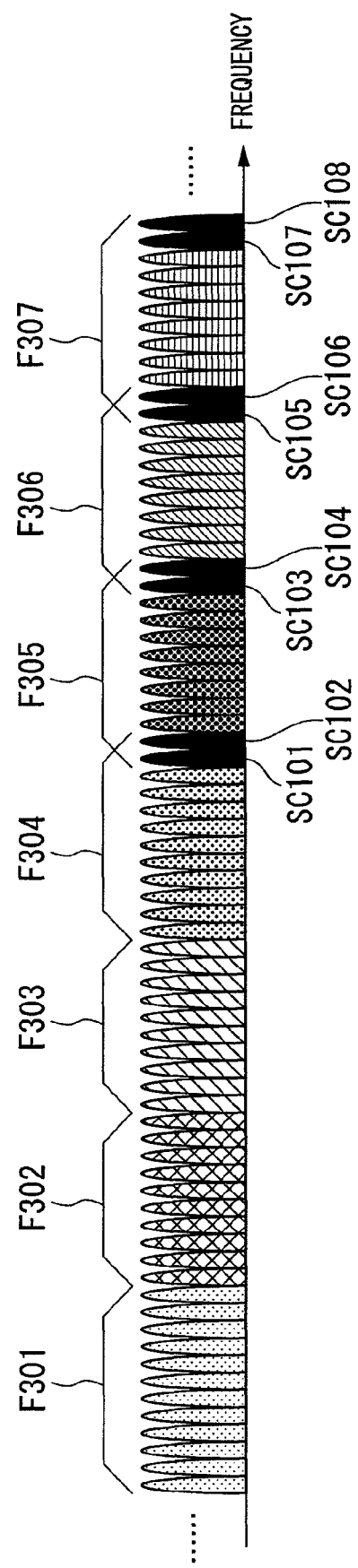
FIG. 7 is a diagram showing a data signal allocation method of a base station device according to a fourth embodiment of the present invention.

This system which performs switching uses a channel arrangement in which available subchannels are limited by the transmission scheme as shown in FIG. 7.

FIG. 7 is a diagram showing data signal allocation in the base station device according to the fourth embodiment of the present invention. In FIG. 7, the horizontal axis is the frequency.

In FIG. 7, a subchannel in a frequency domain F301, a subchannel in a frequency domain F302, a subchannel in a frequency domain F303, a subchannel in a frequency domain F304, a subchannel in a frequency domain F305, a subchannel in a frequency domain F306, and a subchannel in a frequency domain F307 are arranged from a low frequency to a high frequency.

In FIG. 7, using high frequencies of the frequency domain F304 and the subsequent frequency domains, the subchannels (single carrier channels) in the frequency domains F304, F305, F306 and F307 are allocated to users that use single carrier transmission. Also, using lower frequencies than the frequency domain F304, subchannels (multicarrier channels) in the frequency domains F301, F302 and F303 are allocated to users that use the OFDMA scheme.

In this embodiment, only the subchannels in the frequency domains F304, F305, F306 and F307 to which the users using the single carrier transmission are allocated use subcarriers overlapping with other subchannels.

Specifically, the subchannel in the frequency domain F304 and the subchannel in the frequency domain F305 use overlapping subcarriers SC101 and SC102.

Also, the subchannel in the frequency domain F305 and the subchannel in the frequency domain F306 use overlapping subcarriers SC103 and SC104.

Also, the subchannel in the frequency domain F306 and the subchannel in the frequency domain F307 use overlapping subcarriers SC105 and SC106.

Also, the subchannel in the frequency domain F307 and the subchannel in the frequency domain F308 use overlapping subcarriers SC 107 and SC108.

Accordingly, it is possible to accommodate a larger number of users by a small number of subcarriers without degrading characteristics for users using the OFDMA scheme.

(Fifth Embodiment)

Next, a communication system according to a fifth embodiment of the present invention will be described. The communication system includes a terminal device (also referred to as a first communication device) and a base station device (also referred to as a second communication device). Since the terminal device in the fifth embodiment of the present invention may be the same terminal device as in FIG. 14, description thereof is omitted. Since the base station device in the fifth embodiment of the present invention may be the same base station as the base station device according to the second or third embodiment, description thereof is omitted. In the present embodiment, subcarrier allocation different from that of the above-described embodiments will be described.

Figure 8A:
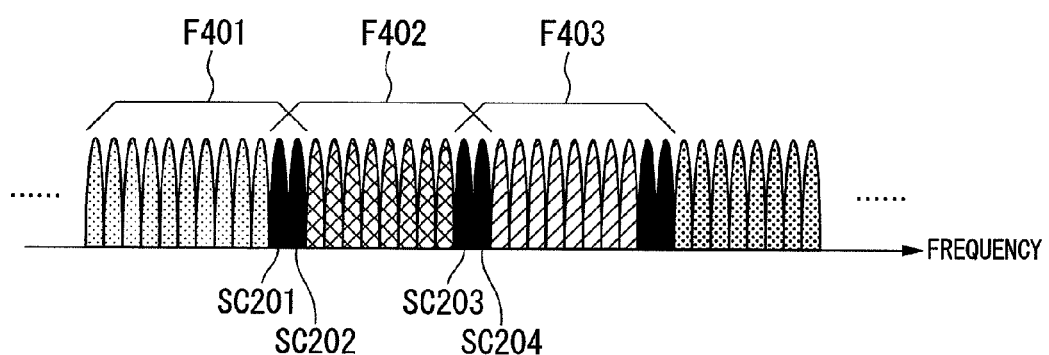
FIG. 8A is a diagram showing an undesired data signal allocation method of a base station device.
Figure 8B:
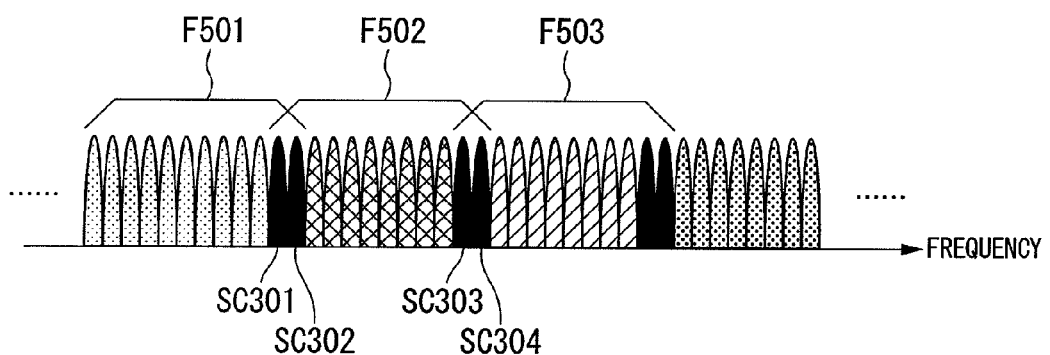
FIG. 8B is a diagram showing a data signal allocation method of a base station device according to a fifth embodiment of the present invention.

FIG. 8A is a diagram showing undesired data signal allocation in the base station device. FIG. 8B is a diagram showing data signal allocation in the base station device according to the fifth embodiment of the present invention. In FIGS. 8A and 8B, the horizontal axis is the frequency.

In the above-described embodiments, the case where some subcarriers within the subchannel are used in an overlapping manner with another subchannel has been described. A channel arrangement capable of accommodating a larger number of users with a small number of subcarriers and a configuration of the base station device capable of demodulating data of each subchannel even in such a channel arrangement will be described.

When one user uses a plurality of subchannels as shown in FIG. 8A, use of overlapping subchannels degrades the reception characteristics. This is because propagation channel characteristics of the overlapping subcarriers may be completely identical and signals may not be separated.

In FIG. 8A, a subchannel of a frequency domain F401 and a subchannel of a frequency domain F402 are allocated to a user $U_A$. A subchannel of a frequency domain F403 is allocated to a user $U_B$.

Overlapping subcarriers SC201 and SC202 are used by the subchannel of the frequency domain F401 and the subchannel of the frequency domain F402. Overlapping subcarriers SC203 and SC204 are used by the subchannel of the frequency domain F402 and the subchannel of the frequency domain F403.

When one user uses a plurality of subchannels, the above-described degradation does not occur because the channel allocation shown in FIG. 8B is performed.

In FIG. 8B, a subchannel of the frequency domain F501 is allocated to the user $U_A$. A subchannel of the frequency domain F502 is allocated to the user $U_B$. A subchannel of the frequency domain F503 is allocated to the user $U_A$.

Overlapping subcarriers SC301 and SC302 are used in the subchannel of the frequency domain F501 and the subchannel of the frequency domain F502. Overlapping subcarriers SC303 and SC304 are used in the subchannel of the frequency domain F502 and the subchannel of the frequency domain F503.

The arrangement in which the same user is not allocated to an adjacent subchannel is shown in FIG. 8B, but the present invention is not limited thereto. The same user may not be allocated to subchannels overlapping with each other.

(Sixth Embodiment)

Next, a communication system according to a sixth embodiment of the present invention will be described. The communication system includes a terminal device (also referred to as a first communication device) and a base station device (also referred to as a second communication device). Since the terminal device in the sixth embodiment of the present invention may be the same terminal device as in FIG. 14, description thereof is omitted. Since the base station device in the sixth embodiment of the present invention may be the same base station as the base station device according to the second or third embodiment, description thereof is omitted. In the present embodiment, subcarrier allocation different from that in the above-described embodiments will be described.

In the E-UTRA system considered by 3GPP, the same frequency band is used in all cells. Thus, a solution to characteristic degradation due to inter-cell interference becomes important. Interference coordination is a technique of reducing the effect of inter-cell interference.

Figure 9A:
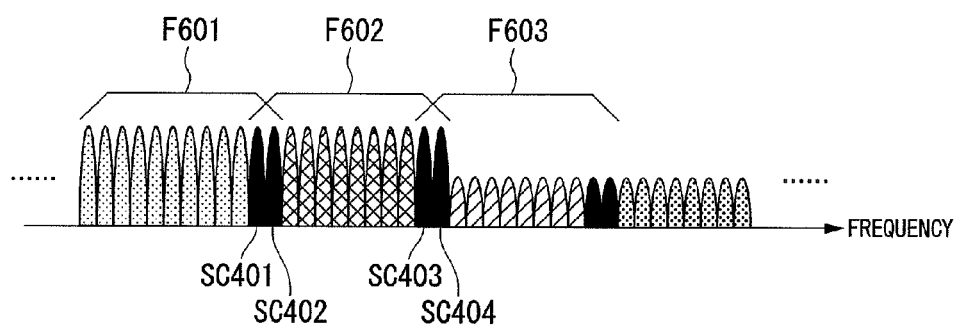
FIG. 9A is a diagram showing a data signal allocation method in one adjacent cell.
Figure 9B:
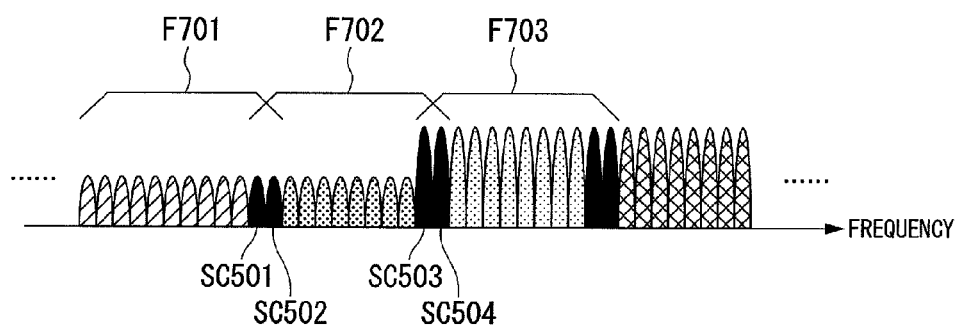
FIG. 9B is a diagram showing a data signal allocation method in another adjacent cell.

This is an arrangement and adjustment technique by which a subchannel capable of being transmitted at high power and a subchannel capable of being transmitted at low power are provided and the subchannel transmitted at high power does not overlap between adjacent cells, as shown in FIGS. 9A and 9B.

FIGS. 9A and 9B respectively show subcarrier allocations in two adjacent cells. FIG. 9A is a diagram showing data signal allocation in one adjacent cell. FIG. 9B is a diagram showing data signal allocation in the other adjacent cell. In FIGS. 9A and 9B, the horizontal axis is the frequency.

In FIG. 9A, a data signal of a user $U_A$ is allocated to a subchannel of a frequency domain F601. A data signal of a user $U_B$ is allocated to a subchannel of a frequency domain F602. A data signal of a user $U_C$ is allocated to a subchannel of a frequency domain F603.

In FIG. 9A, subcarriers SC401 and SC402 are allocated to the subchannel of the frequency domain F601 and the subchannel of the frequency domain F602 in an overlapping manner. Subcarriers SC403 and SC404 are allocated to the subchannel of the frequency domain F602 and the subchannel of the frequency domain F603 in an overlapping manner.

In FIG. 9A, transmission powers of data signals arranged in the subchannels of the frequency domains F601 and F602 are set to be higher than that of a data signal arranged in the subchannel of the frequency F603.

In FIG. 9B, a data signal of a user $U_D$ is allocated to a subchannel of a frequency domain F701. A data signal of a user $U_E$ is allocated to a subchannel of a frequency domain F702. A data signal of a user $U_F$ is allocated to a subchannel of a frequency domain F703.

In FIG. 9B, subcarriers SC501 and SC502 are allocated to the subchannel of the frequency domain F701 and the subchannel of the frequency domain F702 in an overlapping manner. Subcarriers SC503 and SC504 are allocated to the subchannel of the frequency domain F702 and the subchannel of the frequency domain F703 in an overlapping manner.

In FIG. 9B, transmission powers of data signals arranged in the subchannels of the frequency domains F701 and F702 are set to be lower than that of a data signal arranged in the subchannel of the frequency F703.

Using the technology described with reference to FIGS. 9A and 9B, it is possible to improve characteristics for a user located at a cell edge mainly using the subchannel transmitted at high power.

However, when some subcarriers within the subchannel are used in an overlapping manner with another subchannel as shown in FIGS. 9A and 9B, inter-cell interference increases at the boundary between the subchannel capable of being transmitted at high power and the subchannel transmitted at low power.

In this embodiment, an appropriate channel arrangement when some subcarriers within a subchannel are used in an overlapping manner with another subchannel in a system using interference coordination will be described.

Figure 10A:
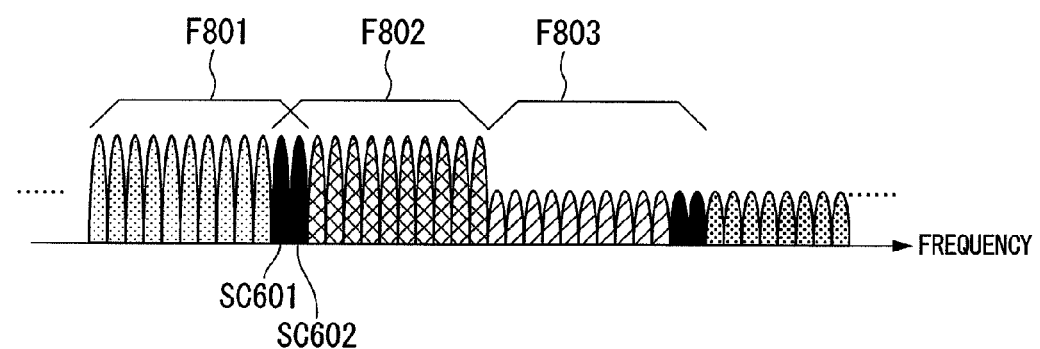
FIG. 10A is a diagram showing a data signal allocation method in one adjacent cell according to a sixth embodiment of the present invention.
Figure 10B:
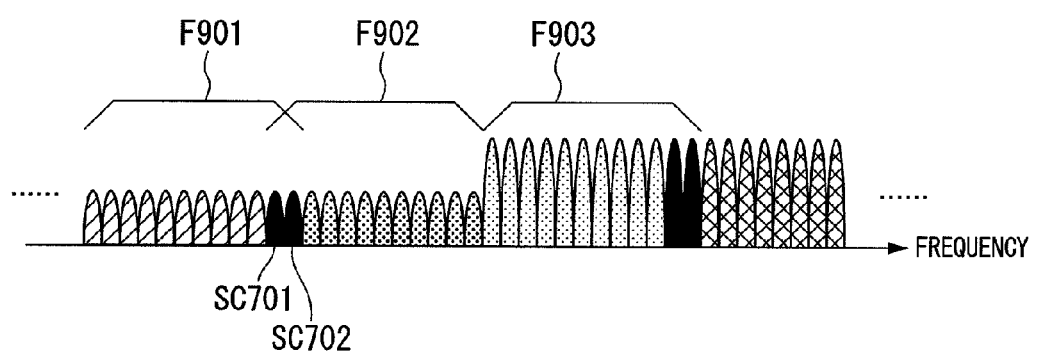
FIG. 10B is a diagram showing a data signal allocation method in another adjacent cell according to the sixth embodiment of the present invention.

FIGS. 10A and 10B are diagrams showing subcarrier allocation according to the sixth embodiment of the present invention. FIG. 10A is a diagram showing data signal allocation in one adjacent cell. FIG. 10B is a diagram showing data signal allocation in another adjacent cell according to the sixth embodiment of the present invention. In FIGS. 10A and 10B, the horizontal axis is the frequency.

As shown in FIGS. 10A and 10B, in this embodiment, when interference coordination is used, subcarriers are not used in an overlapping manner between a subchannel transmitted at high power and a subchannel transmitted at low power. Some subcarriers are used in an overlapping manner only between subchannels having same-level transmission power. Accordingly, it is possible to improve characteristics for a user located at a cell edge without degrading the effect of inter-cell interference reduction by interference coordination.

In FIG. 10A, a data signal of a user $U_A$ is allocated to a subchannel of a frequency domain F801. A data signal of a user $U_B$ is allocated to a subchannel of a frequency domain F802. A data signal of a user $U_C$ is allocated to a subchannel of a frequency domain F803.

In FIG. 10A, subcarriers SC601 and SC602 are allocated to the subchannel of the frequency domain F801 and the subchannel of the frequency domain F802 in an overlapping manner.

In FIG. 10A, transmission powers of data signals arranged in the subchannels of the frequency domains F801 and F802 are set to be higher than that of a data signal arranged in the subchannel of the frequency F803.

In FIG. 10B, a data signal of a user $U_D$ is allocated to a subchannel of a frequency domain F901. A data signal of a user $U_E$ is allocated to a subchannel of a frequency domain F902. A data signal of a user $U_F$ is allocated to a subchannel of a frequency domain F903.

In FIG. 10B, subcarriers SC701 and SC702 are allocated to the subchannel of the frequency domain F901 and the subchannel of the frequency domain F902 in an overlapping manner.

In FIG. 10B, transmission powers of data signals arranged in the subchannels of the frequency domains F901 and F902 are set to be lower than that of a data signal arranged in the subchannel of the frequency F903.

Figure 11A:
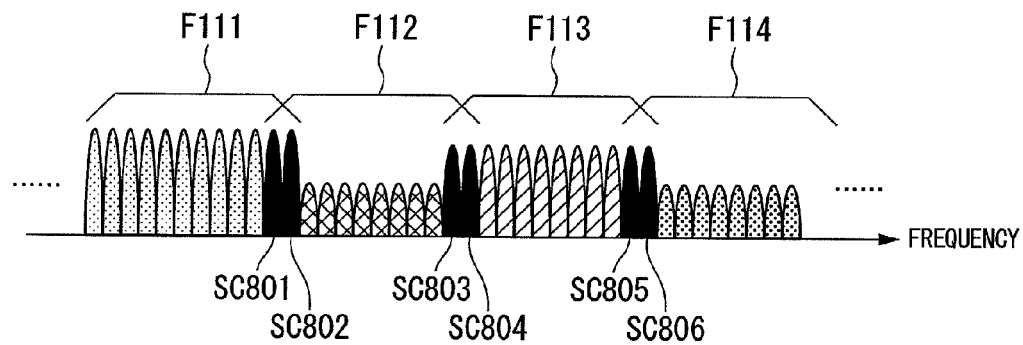
FIG. 11A is a diagram showing another example of a data signal allocation method of the base station device.
Figure 11B:
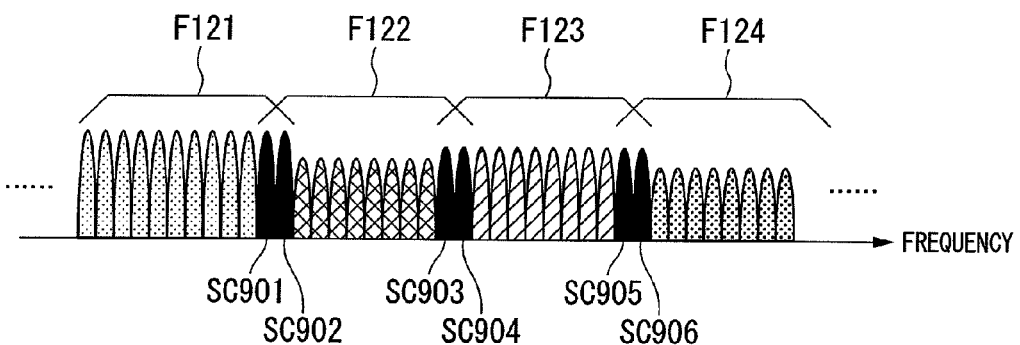
FIG. 11B is a diagram showing a method different from data signal allocation of the base station device according to the sixth embodiment of the present invention.

FIG. 11A is a diagram showing another example of data signal allocation in the base station device according to the sixth embodiment of the present invention. FIG. 11B is a diagram showing a method different from data signal allocation in the base station device according to the sixth embodiment of the present invention. In FIGS. 11A and 11B, the horizontal axis is the frequency.

In FIG. 11A, a data signal of a user $U_A$ is allocated to a subchannel of a frequency domain F111. A data signal of a user $U_B$ is allocated to a subchannel of a frequency domain F112. A data signal of a user $U_C$ is allocated to a subchannel of a frequency domain F113. A data signal of a user $U_D$ is allocated to a subchannel of a frequency domain F114.

In FIG. 11A, subcarriers SC801 and SC802 are allocated to the subchannel of the frequency domain F111 and the subchannel of the frequency domain F112 in an overlapping manner. Subcarriers SC803 and SC804 are allocated to the subchannel of the frequency domain F112 and the subchannel of the frequency domain F113 in an overlapping manner. Subcarriers SC805 and SC806 are allocated to the subchannel of the frequency domain F113 and the subchannel of the frequency domain F114 in an overlapping manner.

In FIG. 11A, reception power of a data signal arranged in the subchannel of the frequency domain F111 is set to be higher than that of a data signal arranged in the subchannel of the frequency domain F113. Also, reception power of a data signal arranged in the subchannel of the frequency domain F113 is set to be higher than those of data signals (excluding data signals arranged in subcarriers SC801, SC802, SC803, SC804, SC805 and SC806) arranged in the subchannel of the frequencies F112 and F114.

In FIG. 11B, a data signal of a user $U_A$ is allocated to a subchannel of a frequency domain F121. A data signal of a user $U_B$ is allocated to a subchannel of a frequency domain F122. A data signal of a user $U_C$ is allocated to a subchannel of a frequency domain F123. A data signal of a user $U_D$ is allocated to a subchannel of a frequency domain F124.

In FIG. 11B, subcarriers SC901 and SC902 are allocated to the subchannel of the frequency domain F121 and the subchannel of the frequency domain F122 in an overlapping manner. Subcarriers SC903 and SC904 are allocated to the subchannel of the frequency domain F122 and the subchannel of the frequency domain F123 in an overlapping manner. Subcarriers SC905 and SC906 are allocated to the subchannel of the frequency domain F123 and the subchannel of the frequency domain F124 in an overlapping manner.

In FIG. 11B, reception power of a data signal arranged in the subchannel of the frequency domain F121 is set to be higher than that of a data signal arranged in the subchannel of the frequency domain F123. Also, reception power of a data signal arranged in the subchannel of the frequency domain F123 is set to be higher than those of data signals (excluding data signals arranged in subcarriers SC901, SC902, SC903, SC904, SC905 and SC906) arranged in the subchannel of the frequencies F122 and F124.

When the reception powers of the adjacent subchannels are greatly different as shown in FIG. 11A, the resolution of a signal of a subchannel having low reception power is not sufficiently taken by A/D conversion, which degrades reception characteristics.

The degradation of the reception characteristics also affects an adjacent subchannel using overlapping subcarriers, and also reception characteristics of a subchannel from which high reception power is obtained are degraded. As a solution to this problem, users for which reception power becomes substantially identical as shown in FIG. 11B are allocated as simultaneously as possible.

That is, in FIG. 11B of this embodiment, the difference between the reception power of the data signal of the frequency domain F121 and the reception powers of the data signals of the frequency domains F122 and F124 is small. On the other hand, in FIG. 11A, the difference between reception power of a data signal of the frequency domain F111 and reception powers of data signals of the frequency domains F112 and F114 is larger than that of this embodiment.

It is possible to remove a subchannel of which the resolution is not sufficiently taken, by simultaneously allocating users for which reception powers are substantially identical as shown in FIG. 11B. It is also possible to obtain good reception characteristics in all subchannels even though overlapping subcarriers are used between adjacent subchannels.

When transmission power control is performed, not only distance attenuation for an individual user or the like may be considered, but propagation channel situations for other users simultaneously allocated may also be considered. This may be performed by the base station device collectively determining information indicating transmission powers for respective users so that reception powers in the base station device are substantially identical.

(Seventh Embodiment)

In this embodiment, weighting subcarriers used in an overlapping manner in a system in which some subcarriers are used in an overlapping manner between adjacent subchannels will be described.

Figure 12A:
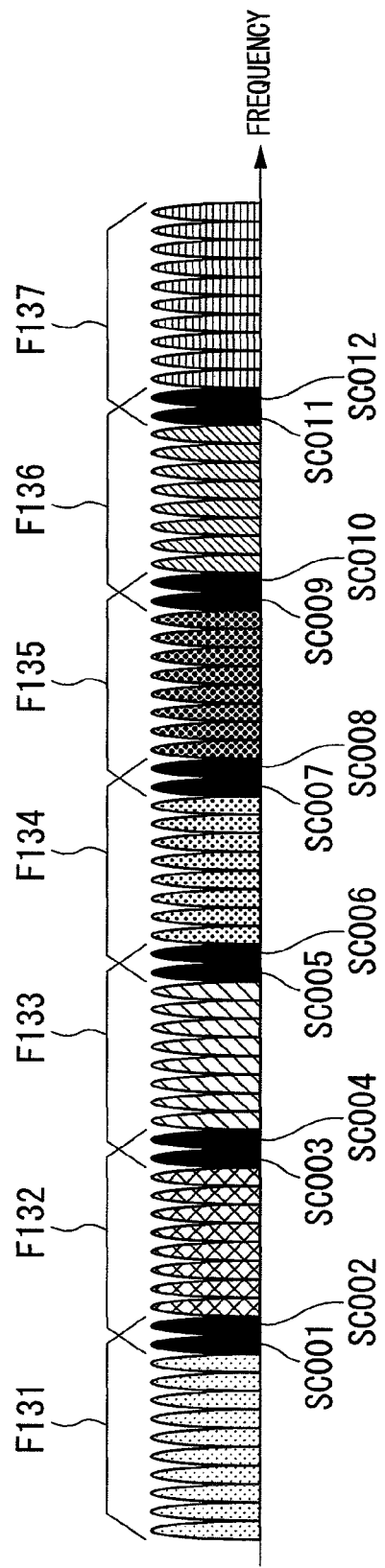
FIG. 12A is a diagram showing a data signal allocation method according to a seventh embodiment of the present invention.

FIG. 12A is a diagram showing a data signal allocation method in the seventh embodiment of the present invention. In FIG. 12A, the horizontal axis represents the frequency. In FIG. 12A, 72 subcarriers are arranged in the frequency direction. 7 subchannels are arranged in order from a low frequency. One subchannel includes 12 subcarriers.

A subchannel in the frequency domain F131 is allocated to a user $U_A$. A subchannel in a frequency domain F132 is allocated to a user $U_B$. A subchannel in a frequency domain F133 is allocated to a user $U_C$. A subchannel in a frequency domain F134 is allocated to a user $U_D$. A subchannel in a frequency domain F135 is allocated to a user $U_E$. A subchannel in a frequency domain F136 is allocated to a user $U_F$. A subchannel in a frequency domain F137 is allocated to a user $U_G$.

Subcarriers SC001 and SC002 are allocated to the subchannel of the frequency domain F131 and the subchannel of the frequency domain F132 in an overlapping manner. Subcarriers SC003 and SC004 are allocated to the subchannel of the frequency domain F132 and the subchannel of the frequency domain F133 in an overlapping manner. Subcarriers SC005 and SC006 are allocated to the subchannel of the frequency domain F133 and the subchannel of the frequency domain F134 in an overlapping manner. Subcarriers SC007 and SC008 are allocated to the subchannel of the frequency domain F134 and the subchannel of the frequency domain F135 in an overlapping manner. Subcarriers SC009 and SC010 are allocated to the subchannel of the frequency domain F135 and the subchannel of the frequency domain F136 in an overlapping manner. Subcarriers SC011 and SC012 are allocated to the subchannel of the frequency domain F136 and the subchannel of the frequency domain F137 in an overlapping manner.

Figure 12B:
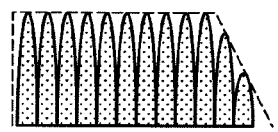
FIG. 12B is a diagram showing a transmission signal of a user $U_A$ allocated to a frequency domain F131 of FIG. 12A.
Figure 12C:
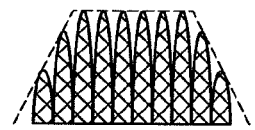
FIG. 12C is a diagram showing a transmission signal of a user $U_B$ allocated to a frequency domain F132 of FIG. 12A.

FIG. 12B is a diagram showing a transmission signal of the user $U_A$ allocated to the frequency domain F131 of FIG. 12A. FIG. 12C is a diagram showing a transmission signal of the user $U_B$ allocated to the frequency domain F132 of FIG. 12A.

As shown in FIGS. 12B and 12C, in this embodiment, weighting (frequency-domain filtering) is used so that power of subcarriers used in an overlapping manner with an adjacent subchannel is decreased.

As shown in FIG. 12B, since the user $U_A$ shares two subcarriers at the right end with the user $U_B$, linear weighting is performed to attenuate power of the subcarriers. Also, since the user $U_B$ shares a total of 4 subcarriers at both ends with the user $U_A$ and the user $U_C$, weighting is performed to attenuate power of the subcarriers.

The transmission power is decreased by such weighting, but total transmission power can be uniformly maintained by distributing power saved from the subcarriers at the end to other subcarriers.

At this time, uniform distribution to non-weighted subcarriers may be used as a distribution method. Transmission power may be sufficiently distributed to subcarriers received at high reception power, according to the propagation channel situation.

It is possible to decrease the PAPR of a transmission signal by weighting the subcarriers at the end. The example of linear attenuation weighting has been shown in FIGS. 12B and 12C, but the present invention is not limited thereto. Weighting using other functions such as a window function of a cosine roll-off filter or a Hamming function may be performed.

Only the user $U_A$ and the user $U_B$ have been described in FIGS. 12A to 12C, but subcarriers used in an overlapping manner are equally weighted and transmitted even for other users $U_C$ to $U_G$.

Figure 13:
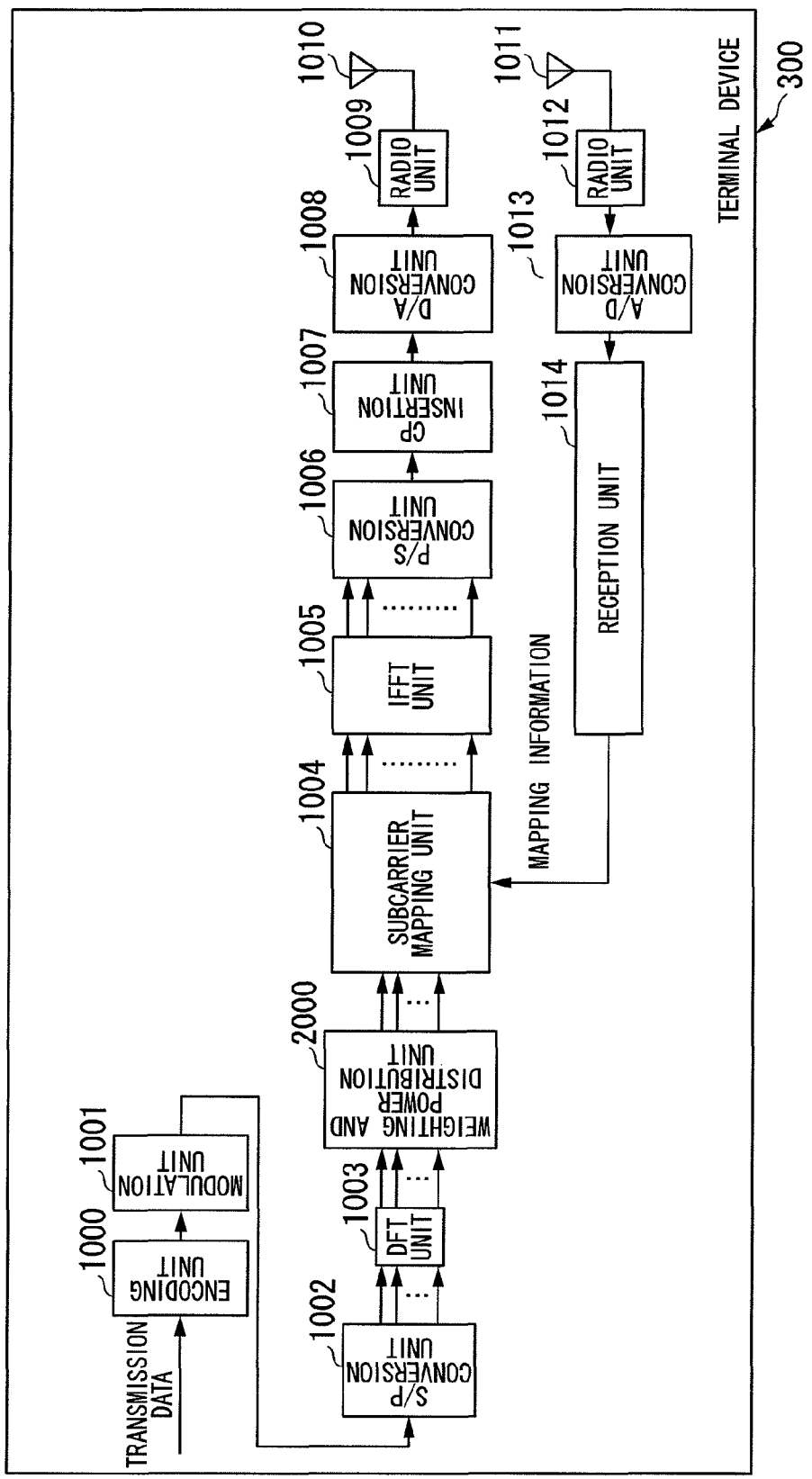
FIG. 13 is a schematic block diagram showing the configuration of a terminal device 300 according to the seventh embodiment of the present invention.

FIG. 13 is a schematic block diagram showing the configuration of a terminal device 300 according to the seventh embodiment of the present invention. As shown in FIG. 13, the terminal device 300 according to this embodiment is configured by adding a weighting and power distribution unit 2000 to the configuration of the terminal device 100z shown in FIG. 14. The weighting and power distribution unit 2000 weights power for subcarriers at an end used in an overlapping manner with an adjacent subchannel as described above and distributes transmission power saved by the weighting.

In this embodiment, the base station device may be implemented by the same configuration as that of the base station device 200c shown in FIG. 5. In this regard, the base station device recognizes in advance information indicating which weighting is performed at the terminal device 300 since a process of regarding the weighting in the terminal device 300 as a part of a propagation channel change is necessary. It is possible to reproduce a transmission signal before weighting by regarding the weighting in the terminal device 300 as a part of a propagation channel change and performing the nonlinear iterative equalization process in the base station device 200c of FIG. 5.

In the above-described embodiments, control of respective parts of the base station device or the terminal device may be executed by recording a program for implementing functions of respective units of the base station device or the terminal device according to the first to seventh embodiments on a computer-readable recording medium and enabling a computer system to read and execute the program recorded on the recording medium. The "computer system" used herein includes an OS, and hardware such as peripheral devices.

The "computer-readable recording medium" is a portable medium such as a flexible disc, magneto-optical disc, ROM and CD-ROM, and a storage device, such as a hard disk, built in the computer system. Furthermore, the "computer-readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

INDUSTRIAL APPLICABILITY

The present invention is applicable to a communication system, a communication device, and a communication method that can increase the number of users capable of being accommodated and that can effectively use a frequency.

The invention claimed is:

1. A communication system comprising a first communication device, a second communication device, and a third communication device, the first communication device configuring a cell,
wherein the first communication device comprises:
a notification unit configured to notify, to the second communication device, an allocation information indicating at least one subcarrier to be used for communication;
a reception unit configured to receive, from the second communication device, a Discrete Fourier Transform-spread-OFDM (DFT-S-OFDM) signal; and
a communication unit configured to communicate with the second communication device by using at least one first subcarrier(s) and at least one second subcarrier(s), which the at least one first subcarrier and the at least one second subcarrier are comprised of a plurality of consecutive subcarriers,
wherein each of the at least one first subcarriers is used by the second communication device and the third communication device in a same time frame, the third communication device being in the cell,
wherein each of the at least one second subcarriers is used by the second communication device, and is not used by the third communication device in a same time frame, and
wherein the allocation information includes information on the at least one first subcarrier(s) and the at least one second subcarrier(s).

2. A communication method of a first communication device comprising:
notifying, to a second communication device an allocation information on at least one subcarrier to be used for the communication; and
communicating with the second communication device by using at least one first subcarrier(s) and at least one second subcarrier(s), which the at least one first subcarrier(s) and the at least one second subcarrier(s) are comprised of a plurality of consecutive subcarriers,
wherein each of the at least one first subcarriers is used by the second communication device and a third communication device in a same time frame, the third communication device being in the cell,
wherein each of the at least one second subcarriers is used by the second communication device, and is not used by the third communication device in the same time frame, and
wherein the allocation information includes information on the at least one first subcarrier(s) and the at least one second subcarrier(s).

3. A first communication device configuring a cell for communication and communicating with a second communication device by using a plurality of subcarriers, the communication device comprising:
a notification unit configured to notify, to a second communication device, an allocation information indicating at least one subcarrier to be used for the communication;
a reception unit configured to receive, from the second communication device, a Discrete Fourier Transform-spread-OFDM (DFT-S-OFDM) signal; and
a communication unit configured to communicate with the second communication device by using at least one first subcarrier(s) and at least one second subcarrier (s), which the at least one first subcarrier(s) and the at least one second subcarrier(s) are comprised of a plurality of consecutive subcarriers,
wherein each of the at least one first subcarriers is used by the second communication device and a third communication device in a same time frame, the third communication device being in the cell,
wherein each of the at least one second subcarriers is used by the second communication device, and is not used by the third communication device in the same time frame, and
wherein the allocation information includes information on the at least one first subcarrier(s) and at least one second subcarrier(s).

4. The first communication device according to claim 3, wherein the at least one second subcarrier(s) is at one end of the plurality of subcarriers.

5. The first communication device according to claim 4, wherein the number of the at least one first subcarrier is set to a fixed value in advance.

6. The first communication device according to claim 3, wherein the communication unit is configured to communicate with the second communication device by switching a plurality of communication schemes, and
wherein the plurality of communication schemes include at least one of an orthogonal frequency division multiple access scheme and a single carrier-frequency division multiple access scheme.

7. The first communication device according to claim 3, wherein the number of the at least one first subcarrier(s) is fewer than the number of subcarriers configuring an access unit of the communication.

* * * * *